(12) United States Patent
Guay et al.

(10) Patent No.: US 11,734,757 B2
(45) Date of Patent: Aug. 22, 2023

(54) COMPUTER IMPLEMENTED METHOD AND SYSTEM FOR AUTOMATING ANALYSIS OF PROFIT AND LOSS (PNL) VARIATIONS BASED ON MARKET EVENTS

(71) Applicant: Banque Nationale du Canada, Montreal (CA)

(72) Inventors: David Shaun Guay, New York, NY (US); Remi Croteau, Montreal (CA); Olivier Lefebvre, Montreal (CA)

(73) Assignee: Banque Nationale du Canada, Montreal (CA)

( * ) Notice: Subject to any disclaimer, the term of this patent is extended or adjusted under 35 U.S.C. 154(b) by 104 days.

(21) Appl. No.: 17/221,026

(22) Filed: Apr. 2, 2021

(65) Prior Publication Data
US 2021/0319509 A1   Oct. 14, 2021

Related U.S. Application Data

(60) Provisional application No. 63/009,658, filed on Apr. 14, 2020.

(51) Int. Cl.
| | | |
|---|---|---|
| *G06Q 40/00* | (2023.01) | |
| *G06Q 40/04* | (2012.01) | |
| *G06Q 30/0201* | (2023.01) | |
| *G06Q 10/0631* | (2023.01) | |

(52) U.S. Cl.
CPC ....... *G06Q 40/04* (2013.01); *G06Q 10/06315* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 1,031,151 | A | 7/1912 | Smith |
| 5,278,687 | A | 1/1994 | Jannson et al. |
| 5,842,010 | A | 11/1998 | Jain et al. |
| 6,005,851 | A | 12/1999 | Patterson et al. |

(Continued)

FOREIGN PATENT DOCUMENTS

| | | |
|---|---|---|
| CA | 2927607 A1 | 1/2011 |
| CA | 2706252 A1 | 3/2011 |

(Continued)

OTHER PUBLICATIONS

Canadian Patent Application 3,114,228 Examination Search Report dated Mar. 15, 2023.
Yahoo Finance, 2023, https://finance.yahoo.com.

*Primary Examiner* — Olabode Akintola
(74) *Attorney, Agent, or Firm* — Erise IP, P.A.

(57) ABSTRACT

A computer implemented method, a system and a non-transitory storage medium are provided, for automatically recreating and displaying the chronology of market events that led to a variation in a profit and loss (PnL) account of an entity implementing a trading strategy. The chronology of market events is represented in a graphical user interface. The trading strategy is run by a plurality of processing devices which are remotely located from one another. A computer implemented method for automatically identifying chains of market events is also provided, where the market events have led to unusual variations in a profit and loss (PnL) account of a group of securities traded by an entity.

20 Claims, 11 Drawing Sheets

(56) References Cited

U.S. PATENT DOCUMENTS

| | | | |
|---|---|---|---|
| 7,555,456 | B2 | 6/2009 | Rosenthal et al. |
| 7,912,781 | B2 | 3/2011 | Rosenthal |
| 8,429,059 | B2 | 4/2013 | Rosenthal |
| 9,578,540 | B1 | 2/2017 | Adams |
| 9,600,843 | B2 | 3/2017 | Creamer et al. |
| 9,619,410 | B1 | 4/2017 | Brandenberger |
| 9,674,118 | B2 | 6/2017 | Walker et al. |
| 9,846,910 | B2 | 12/2017 | Marynowski et al. |
| 9,882,781 | B2 | 1/2018 | Pope |
| 9,940,670 | B2 | 4/2018 | Aisen et al. |
| 9,990,393 | B2 | 6/2018 | Parsons et al. |
| 10,057,333 | B2 | 8/2018 | Pitio et al. |
| 10,101,808 | B2 | 10/2018 | Buck |
| 10,305,786 | B2 | 5/2019 | Aked |
| 10,310,534 | B2 | 6/2019 | Forbes, Jr. |
| 2006/0129473 | A1* | 6/2006 | Hansen .................. G06Q 40/06 705/37 |
| 2008/0270289 | A1* | 10/2008 | Petrino .................. G06Q 40/04 705/37 |
| 2010/0287294 | A1 | 11/2010 | Battyani et al. |
| 2013/0159449 | A1 | 6/2013 | Taylor et al. |
| 2015/0073967 | A1 | 3/2015 | Katsuyama et al. |
| 2015/0324915 | A1* | 11/2015 | Ma ........................ G06Q 40/04 705/37 |
| 2019/0020466 | A1 | 1/2019 | Raymond |
| 2019/0155933 | A1 | 5/2019 | Walker |

FOREIGN PATENT DOCUMENTS

| | | |
|---|---|---|
| CA | 2913700 A1 | 6/2016 |
| CA | 2922072 A1 | 8/2016 |
| CA | 2927532 A1 | 8/2016 |
| CA | 2707196 A1 | 11/2016 |
| CA | 3000464 A1 | 4/2017 |
| JP | 5049588 B2 | 10/2012 |

* cited by examiner

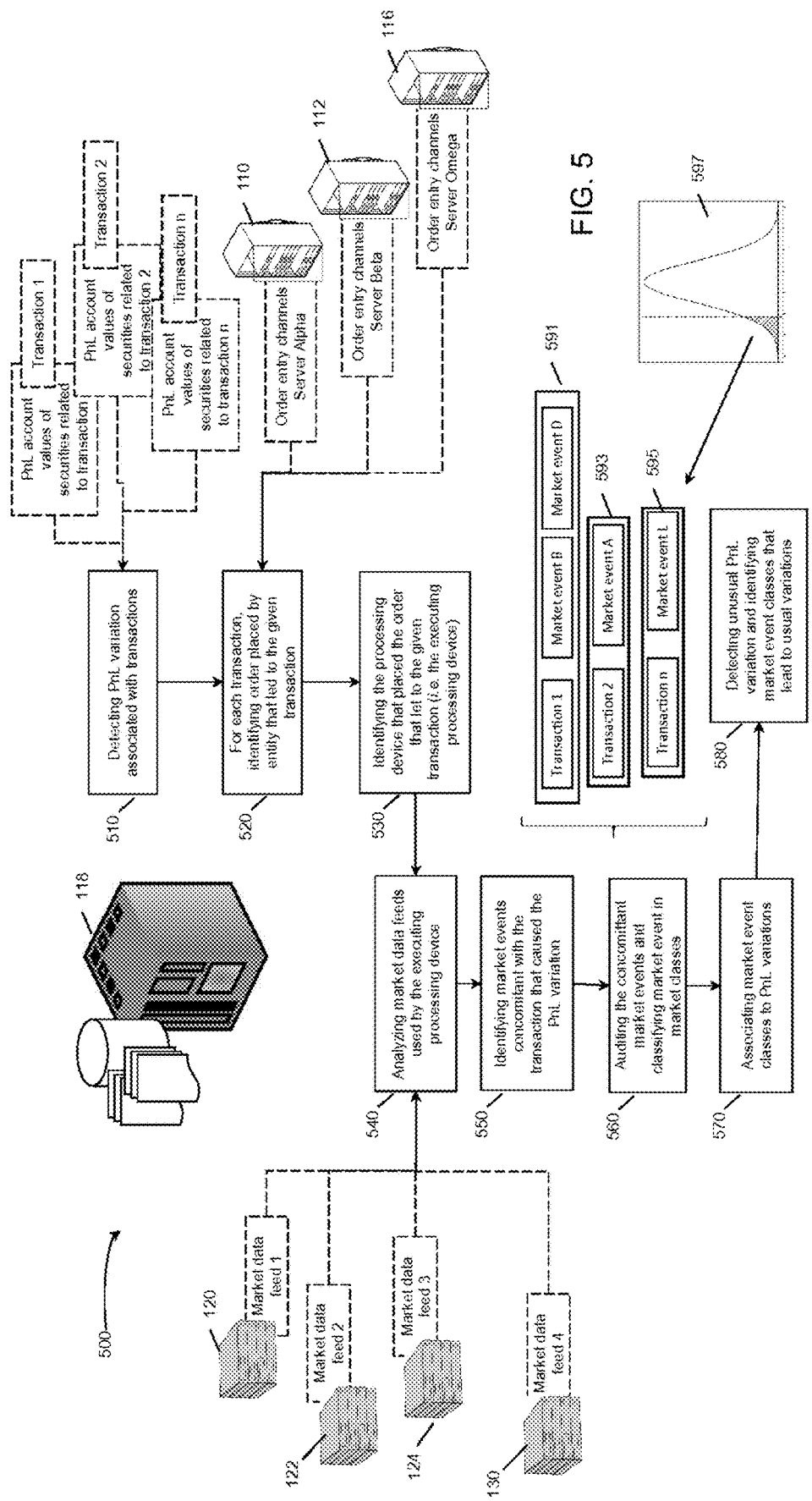

COMPUTER IMPLEMENTED METHOD AND SYSTEM FOR AUTOMATING ANALYSIS OF PROFIT AND LOSS (PNL) VARIATIONS BASED ON MARKET EVENTS

RELATED APPLICATION

The present application claims the benefit of U.S. Provisional Application No. 63/009,658 filed Apr. 14, 2020, the entire disclosure of which is hereby incorporated by reference in its entirety.

TECHNICAL FIELD

The technical field generally relates to the field of security trading, and more particularly relates to systems and methods for the automated analysis of market events and account value variations, also known as profit and loss of an account.

BACKGROUND

It is common for financial institutions, brokers and trading entities to engage in market making or trading activities of securities, including for example stocks and commodities. A financial institution may engage in market making activities on multiple exchanges (such as the BZX, BZY, NYSE, CME, etc.) that require carrying out pre-determined strategies using rules or algorithms operating on multiple servers, feeding off from multiple sources of market data (also referred to as financial data or trading data). Market making and trading activities result in millions of trades a day each being carried out in fractions of a second.

Trading strategies are generally implemented by dedicated servers and algorithms that receive various market data feeds as an input and carry out various activities, such as placing orders for the execution of trades for a given financial instrument, based on the market data. The dedicated servers and algorithms are therefore configured to react to events occurring on one or more market exchanges, such that losses are avoided and/or profits are made on behalf of a trading entity.

In the course of a typical day, a trading strategy running on one or more markets can incur normal variations on the profit and loss (PnL) account associated with the financial instruments being traded when implementing the strategy. The PnL variations may lead to a global positive or negative PnL at the end of the day. In some cases, a trading strategy may incur unusual profits or losses, significantly impacting the global PnL of one or more accounts. Market makers and trading entities are interested in identifying the causes of such unusual variations, in order to modify their trading strategies or their network of trading servers, so that the positive or negative impacts on the global PnL may be repeated or avoided.

Currently, trading analysts try to investigate the causes of such variations with limited success, given the enormous amount of market data that needs to be reviewed and the lack of efficient and reliable tools available. More often than not, the analyses are inconclusive and/or take too much time to be realized efficiently and in a timely manner.

There is a need for new systems and methods that can help automate the analysis of market events, so to provide context for unusual PnL account variations in securities being traded by a given entity.

SUMMARY

According to an aspect, a computer implemented method for automatically recreating and displaying the chronology of market events that led to a variation in a profit and loss (PnL) account is provided. The PnL account relates to one or more securities traded by an entity, which implements a trading strategy for the security(ies). The trading strategy is run on a plurality of processing devices which are remotely located from one another.

In possible implementations, the method comprises a step of detecting a PnL variation by analyzing an aggregated PnL account associated with the one or more securities traded by the entity. A security may comprise cash, derivative instruments, stocks, commodities, bonds, futures, options, exchange traded funds (ETF), contracts, debt-based instruments, currencies traded on foreign exchange markets and/or equity-based instruments.

The method also comprises a step of analyzing order entry channels sent by the plurality of processing devices, where the order entry channels comprise orders placed by the entity. The order that, when fulfilled, led to the transaction that has caused a noticeable fluctuation, is identified from the order entry channels. Once the order has been identified, the processing device that placed said order can be identified. This processing device can be referred to as the "executing processing device".

The method further comprises a step of analyzing market data feeds that were used by the executing processing device when the identified order was fulfilled. From those market data feeds, the market events that were concomitant to the transaction that caused the PnL variation are identified, using timestamps for example. A market event can be any type of event that can affect a security, including as examples only: price and/or volume variations of a security and transactions completed for the security of interest or transactions of other securities related to the security of interest. Analyzing the market data feeds can include a step of requesting market data feeds from market data vendors, aggregators and normalizers.

The method then comprises a step of organizing the concomitant market events in a time frame to obtain a chronological representation of the events, from the executing processing device standpoint. The method finally comprises a step of displaying, within a graphical user interface, the life cycle of the order that led to the transaction, wherein the life cycle data is obtained from the entity's order entry channels, as well as the market events which were concomitant to the transaction, wherein the market events data is provided by the market data feeds.

Information relating to the life cycle of an order can include: the time at which the order was placed, modified, executed/fulfilled or cancelled by the entity conducting the trading strategy; the bid or ask price and volume associated to said order, the acknowledge times from exchanges, including the acknowledge time at which the new order was received at the exchange ("ack on new order") and the acknowledge time at which the order was cancelled at the exchange ("ack on cancel order"); "fills" information including the time at which the order was fulfilled (or executed), the price at which the order was fulfilled and the volume at which the order was fulfilled, whether the order was partially or fully fulfilled.

The graphical user interface automatically recreates and displays the chronology of market events that led to the transaction that caused the variation of the PnL account. Additional market event data and/or additional order entry data can be added to the graphical user interface, allowing market events and order entries from the standpoint of additional processing devices to be displayed. The additional processing devices can be part of the plurality of processing devices implementing the strategy but aren't necessarily. Based on user input, the software application generating the graphical user interface can calculate a time difference between any two events or orders selected through the interface, where the resolution is at least in the order of fractions of a second.

In possible implementations, the method may include a step of calculating a time delay between an actual time at which one of the market events occurred at an exchange and its receipt time at the executing processing device, in order to determine whether the variation was caused by said time delay at the executing processing device.

In possible implementations, the graphical user interface comprises a first panel for displaying prices of the securities (as a function of time) associated with the market events, and for displaying transactions associated with the securities. The user interface can include a second panel for displaying the life cycle of orders. The graphical user interface allows users to browse within the windowpanes, such as zooming in and out of the interface, to better visualize market events and orders, down to the resolution of the market event and order data timestamps. The software application generating the graphical user interface can measure time differences between any two market events and/or order representations displayed on the user interface, with at least a fraction of second precision.

In possible implementations, the user interface allows measuring time differences between first and second market events, both represented on the same user interface, within the same time frame, by capturing a first input by a user on the graphical user interface, positioned on or close to the first market event representation; receiving a second input by the user on the graphical user interface, positioned on or close to second market event representation; and displaying on the graphical user interface the time difference between the first and second representations.

In possible implementations, in the first panel, the prices of securities are displayed as segmented lines wherein line breaks indicate a price increase or a price drop. The transactions may be displayed as visual indicators, comprising the time and price at which the transaction occurred and the scale of the visual indicator being proportional to the price or volume of securities that were traded. The graphical user interface may include a third panel for displaying volume representations associated with the securities whose prices are displayed in the first panel, the volume being displayed as segmented lines, wherein line breaks are indicative of a volume increase or a volume drop. Different colors or line patterns may be used for differentiating the different securities, the same security from different exchanges, prices associated with the securities; and wherein bars are used for representing the order life cycle.

In possible implementations, the resolution of the graphical user interface is in function of the timestamps of the market data and orders data contained in the market data feeds and order entry channels, and preferably in the order of fractions of seconds.

In possible implementations, the graphical user interface allows browsing in the user interface, such as zooming in and out of the interface, to better visualize the market event and order representations, down to the resolution of the market event and order data timestamps.

The aggregated PnL account can be continuously or periodically calculated. A PnL variation can be presented as price variations as a function of time, but also as a distribution of PnL variations (or increments), for example at each second. There can be different methods for identifying variations in the PnL account, including for example detecting unusual variations that are below or above a given threshold, detecting variations using machine learning algorithms, or comparing the variation to a statistical distribution of PnL variations for said one or more securities.

According to another aspect, a computer implemented method for automatically identifying chains of market events that led to unusual PnL variations in a profit and loss (PnL) account is also provided. This method is related to the method described above and comprises some steps that are similar. In this implementation, for each of a selected group of transactions completed for a security or group of securities traded by the entity, the PnL account value is calculated before and after the transaction occurred, and a PnL variation is determined and associated to the transaction. The order placed by the entity that led to the transaction is identified, as well as the processing device that placed the order. Market data feeds used by the processing device before or after the time the transaction occurred are requested and, from these market data feeds, market events that occurred before the transaction, or thereafter, over a given period (referred to as concomitant market events) are identified. The concomitant market events are then audited and classified into market event classes. A market event class typically comprises the transaction and at least one concomitant market event, for example the last market event that occurred just before or just after the transaction. Different sets for market events can form part of a class. Then, the determined PnL variation is associated with each market event class.

A system and a non-transitory storage medium, comprising processor-executable instructions for implementing the method are also provided.

As a trading session unfolds, PnL variations are continuously associated to the different market event classes (or chain of events). Unusual PnL variation can be detected by continuously comparing each PnL variation of a class to the statistical distribution of the PnL variations for said class, whereby the chain of events that lead to the unusual variation corresponds to the market events of said class. The method therefore allows to identify specific series of events that are likely to cause unusual PnL variations, and thus provides a tool for traders to readjust their trading strategy if needed. Alerts can be generated when an unusual PnL variation for a given market event class is detected.

BRIEF DESCRIPTION OF THE FIGURES

Other features and advantages of the present invention will be better understood upon reading the following non-restrictive description of possible implementations thereof, given for the purpose of exemplification only, with reference to the accompanying drawings in which:

FIG. 5 is a flow chart illustrating the steps of a computer implemented method for automatically identifying chains of market events that led to unusual PnL variations in a profit and loss (PnL) account, according to a possible embodiment of the invention.

DETAILED DESCRIPTION

Figure 1:
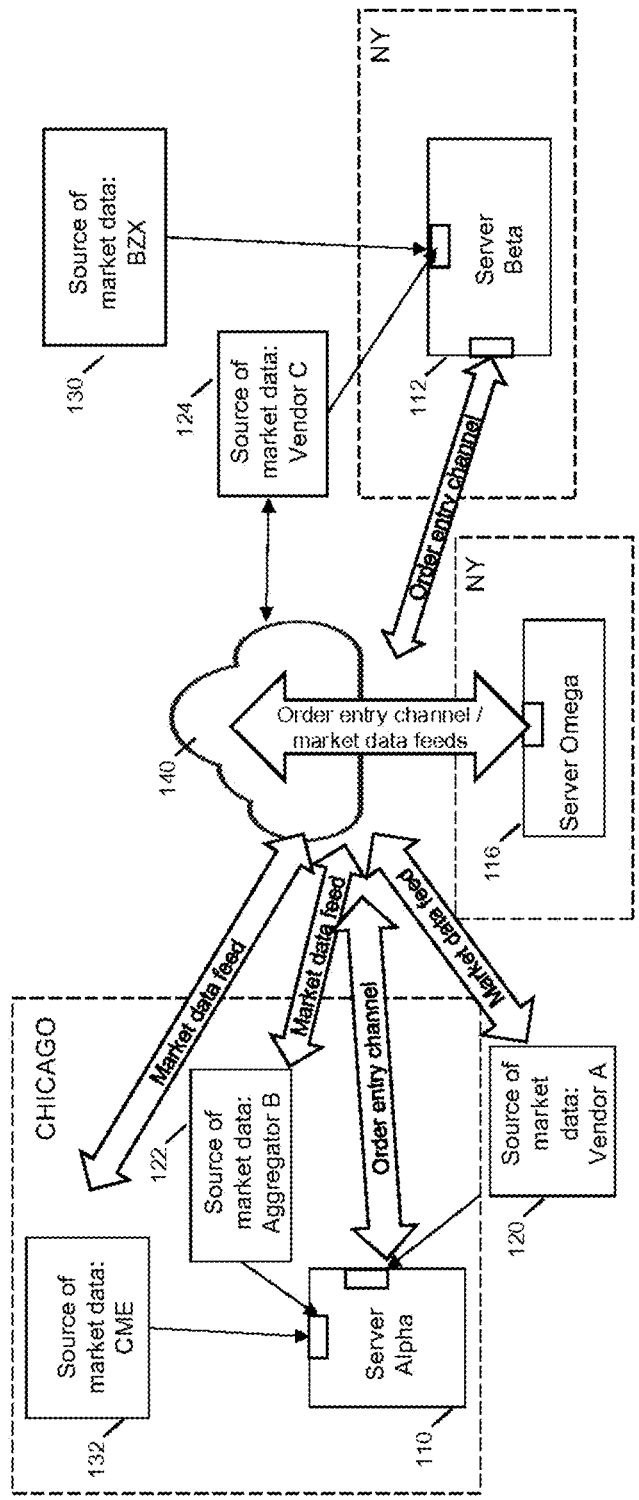
FIG. 1 is a schematic diagram of a system architecture showing different processing devices, remotely located from one another and involved in the execution of the computer-implemented method, according to a possible embodiment.

In the following description, similar features in the drawings have been given similar reference numerals and, to not unduly encumber the figures, some elements may not be indicated on some figures if they were already identified in a preceding figure. It should be understood herein that the elements of the drawings are not necessarily depicted to scale, since emphasis is placed upon clearly illustrating the elements and interactions between elements.

In the present description, the term "security" refers to a financial asset or an aggregate of financial assets, i.e. a financial instrument that has a monetary value. Securities may include but are not limited to: cash and/or derivative instruments, stocks, commodities, bonds, futures, options, exchange traded funds (ETFs), contracts, debt-based instruments, currencies traded on foreign exchange markets and/or equity-based instruments.

The terms "trading data", "financial data" and "market data" are used interchangeably and refer to data relating to, defining or characterizing securities. "Market data" can comprise values corresponding to the previous state or the current state of a security, including for example previous or current "top of the book" bid price, bid volume, ask price and ask volume. "Market data" can also comprise information on completed transactions, date and time of transactions, exchange identifiers, security identifiers such as ticker symbols, correction notices and/or administrative messages. Depending on the source of trading data, the data format may differ. An "order" corresponds to an offer to buy (Bid) or sell (Ask) a security. Orders flow into the exchange and are inserted into a sorted "book" of orders, triggering the publication of one or more events on the market data feeds. The highest bid and the lowest ask are referred to as the top of the book or the best book order.

A "market data feed" corresponds to a flow of market data incoming or outgoing from a processing device. Market data feed can be generated by different sources of market data, including for example the different exchanges, financial institutions, but also market data vendors, aggregators or normalizers, including for example Bloomberg, Interactive Data Corporation, Cbonds, iQFeed, eSignals, and the like. Market data feeds can include L1, L2 or L3 data feeds, as is commonly known in the field, where an L3 feed comprises the full depth of the book, i.e. the orders for all securities; an L2 feed comprises the top of book (BBO) and also the 5 to 15 closest price levels, each level including the orders for the same bid price or ask price, and the corresponding aggregate volume per price level. An L1 feed comprises only the highest bid and lowest ask prices and corresponding number or volume. The volume can correspond to the number of shares, contracts or units available for sale at the ask price or for purchase at the bid price. Market data feeds are formed of a continuous flow of records, where the records include fields with text and/or numeric data, each field providing information on a market event.

An "order entry channel" corresponds to the flow of orders placed, modified, cancelled or executed by, or on behalf of, a given trading entity. While "market data feeds" typically convey market data whose source is external to the trading entity, an "order entry channel" conveys orders originating from the trading entity and related updates from the exchange to which they are sent. Order entry channels are bidirectional in the sense that they convey status updates from both the trading entity and the exchange about an order from the trading entity. "Order entry channels" are sometimes referred to as "private data feeds". Since a trading entity owns or controls several processing devices remotely located from one another, in different cities, in the vicinity of different exchanges or trading venues, different processing devices pertaining to the same trading entity generate different "order entry channels".

A "record" is to be understood as an object or a data structure that "holds" or "contains" a group of values relating to a given security or financial instrument. Records contain different fields, such as a security codes, bid or ask prices, bid or ask volumes, dates, timestamps, market period, etc., as examples only. Fields of records are typically only stored temporarily, as they are continuously updated, and can be transmitted or saved in database tables, arrays, files (such as ASCII, ASC, .TXT, .CSV, .XLS, etc) and can transit in memory, such as registers, cache, RAM or flash memory, as examples only. The different fields can include numeral, date or character values.

An "order" is an instruction to buy or sell on an exchange or trading venue a financial instrument. An "order" can be encapsulated in an electronic "record" and contains different fields such as those described above, including type of order (market order, limit order, etc.), price, volume, financial instrument ID or ticker symbol, etc., and an action to be taken for this order: place, modify, cancel, etc. The "life cycle" of an order comprises all the steps or stages of an order, from the moment the order is placed on the market to the time the order is executed or cancelled. A "transaction", also referred to as a "trade", is the execution of the order. An order is typically filled or executed based on current market ask(sell) and bid(buy) prices.

The term "processing device" encompasses computers, nodes, servers, NIC (network interface controllers), switches and/or specialized electronic devices which are involved in the trading process, and which receive, process and/or transmit market data. "Processing devices" are generally part of "trading systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, as examples only. The type of memory is of course chosen according to the desired use, whether it should retain instructions, or temporarily store, retain or update data.

The term "market event" encompasses any event or activity that relates to the status of a financial instrument and/or to orders and transactions of financial instruments. A "market event" can for example be a change or a variation in the status of an order, such as a new order being placed, an order being modified, an order being cancelled, an order being partially or fully fulfilled. A market event can also comprise a price variation of a security, such as a price increase or a price drop, a change in volume available for trading of a given security, etc. Market events can also include variations in inflation and interest rates, exchange rates, etc. In the context of this specification, a "market event" is defined by a change or variation in time of a field of a "record", wherein the "record" can relate to an order, to a transaction, to a financial instrument, to a rate, etc.

The expression "Profit and Loss account", also referred to as "PnL account" or "P&L account", or simply "PnL", refers to the net profit or loss (i.e. the monetary value) over time from trades of, or from holding, a security or of a set of securities. In this later case, the PnL account can be referred to as an aggregated PnL account. A PnL account can be associated with a value, such as a monetary value, that can be calculated and presented graphically. A variation in a PnL account is the difference between a first PnL account value at a given point in time, and a second PnL account value at another point in time. An abnormal variation or anomaly in a PnL account can occur when the variation exceeds an expected variation, for example based on historical data for the PnL account, or when the variations are at the outmost edges of a normal distribution of PnL variations for a given security.

It is common for PnL accounts to be based on a group of securities, since the risk associated with trading a given security is generally offset by trading one or more related securities. Ideally, PnL accounts rise gradually over time, with some variation. However, there are times when a PnL account drops for some reason. Given that the PnL account is based on a plurality of securities, it is difficult to identify, amongst all the trades completed during a period of time associated with the drop, which one(s) caused or is(are) related to the drop.

In the present description, and unless stated otherwise, the terms "connected", "coupled" and variants or derivatives thereof refer to any connection or coupling, either direct or indirect, between two or more elements. The connection or coupling between the elements may be mechanical, physical, operational, electrical or a combination thereof.

Context

Market makers and trading entities engaged in market making and/or trading receive various types of market data feeds from the markets (i.e. exchanges) or from market data vendors. The market data feeds may be unprocessed (raw) or processed (L1, L2 or L3 data feeds, for example). Different processing devices receive the different trading data feeds at different times and with different delays and execute one or more trading strategies based on the information contained in the market data feeds they receive.

When the entity is a market maker, completed trades are generally not made by the entity. The role of a market maker (or "liquidity provider") is to facilitate trades, and thus regularly and continuously place bids and ask orders during exchange hours at public quote prices, so that investors can trade the security or financial instrument held by the market maker when they need to. Thus, the market maker regularly places bid orders and ask orders on predetermined securities (to create a spread), and investors (buyers or sellers) are typically the ones that complete the trades against those bid and ask orders. Therefore, a transaction is generally completed when an investor or trading entity places an order that matches the ask or bid order placed by the market maker. A PnL variation could thus be the result of such a completed trade stemming from an order previously placed by an entity (trading or market making), and if the trade has caused an unusual drop or rise in the PnL, it would be extremely useful for the entity to determine which order, from the thousands of orders placed, was matched for the transaction to be completed, and in which context did the trade occurred or the order was placed (i.e. what were the market events.) In another example, a PnL variation could simply be the result of an updated top of the book for a security held by the entity after, for example, large volumes of the security were traded between competing entities therefore impacting the value of the volume of securities held by the entity. It would then be equally useful for the entity to determine in which context the trade between the competing entities occurred.

Before developing the present tool and method, there was no available solution that allowed such determinations to be made in an efficient and timely manner. PnL accounts vary continuously during daily trading sessions, and there are no means available for traders to identify the order at the root of a variation, and the context in which that order was placed.

As per the brief description provided above, a market data feed comprises a continuous flow of records, where most of the records are associated with securities being traded. Other records can include for example exchange rates, market indices, etc. A record associated to a security comprises different fields that contain information on the given security. For example, a record may be related to security ABC traded at one of the Bats Exchanges (BZX or BYX) and comprise various fields. The fields can comprise some of the following information: the ticker symbol of the security (ABC), the exchange where it is traded (BZX), the top of book bid price, the top of book ask price, the top of book bid volume, the top of book ask volume, the last traded price, the last traded volume, the indication of a completed trade for ABC at the BZX, a new trade order price and volume for ABC at BZX, an identification number of the trading entity that placed the new trade order for ABC at BZX, the time at which the order was placed, a notification of corrections and/or admin messages.

Based on the information contained in the market data feeds, a trading strategy that is programed on the processing device executes, or abstains from executing, an action such as, but not limited to, sending a new trading order, cancelling a trading order or modifying a trading order. The actions executed by the processing device can be based, as examples only, on a comparison between the numeric value or the text of market events record fields conveyed by the market data feeds, or on the chronology of market events defined by records fields of the market data feeds.

When two or more market events are logically linked, they can form a chain of events. For example, a first processing device of a trading entity may identify a first record in an order entry channel, that defines the following event: a sell order from the trading entity for security ABC, for a volume of X at price Y. The record defining this market event can be labeled as "market event 1" by the device. The device may subsequently identify in a market data feed a second record and a third record, respectively indicating that competing trading entity 1 and competing trading entity 2 each bought a substantial volume of securities ABC at the price of Y and a fourth record indicating that the "ask price" (i.e. top of the book price) for security ABC is now Y+1, while it was Y in a previous record received by the processing device. The information contained in the second, third and fourth records can be labeled "market event 2", "market event 3" and "market event 4" by the processing device. Together, "market event 1", "market event 2", "market event 3" and "market event 4" can be labeled as "chain of events 1". Also, depending on the link between events 1, 2, 3 and 4, additional market events can be added to the "chain of events 1". Also, as explained below, the trading entity could decide to limit "chain of events 1" to the occurrence of events 1, 2 and 3. "Market events" can comprise events originating from various devices, such as devices controlled by the trading entity executing its trading strategy and/or by devices controlled by competing trading entities.

The processing device, and associated software application, of the trading entity can be programmed to execute a trading strategy that recognizes a specific chain of events, such as "chain of events 1", and sends instructions to the market in response. For example, when the processing device recognizes "chain of event 1", it could be programmed to cancel the previous sell order for security ABC ("market event 1") quickly enough to avoid seeing the sell order being filled by a competing trading entity at a price of Y, while the new "ask price" is Y+1. Alternatively, the processing device of the trading entity can be programmed to cancel the previous sell order as soon as it recognizes a portion of "chain of events 1" comprising "market event 1", "market event 2" and "market event 3" because an increased volume of securities ABC being traded may be an indication that the ask price for a security is about to increase ("market event 4"). In another example, when a competing processing device recognizes "chain of events 1", it could be programmed to send a new order on the market to buy security ABC at the price of Y in order to fill sell orders that were not canceled quickly enough after the occurrence of market events 1, 2, 3 and 4.

Although the previous example is made from the standpoint of a market maker placing passive sell orders, a person of skill in the art would understand that the previous example, as well as any other example herein, may also be made from the standpoint of a market maker placing, passive or aggressive, sell or buy orders without affecting the scope of the disclosure. A person of skill in the art would also understand that examples herein may be made from the standpoint of any trading entity and that transaction between any trading entities may be made at any price without affecting the scope of the disclosure.

The main purpose of a market making strategy is to provide liquidity to market participants while generating a fair return over the technology investment necessary for market making activities. Generating that return requires the strategies to make small profits and avoid losses while trading a security on a market. Thus, a trading strategy can be programmed to execute an action when a specific event or chain of events occurs, to incur profits, and avoid losses. Sometimes, a trading strategy may incur systematic losses when, for example, a competing trading entity identifies a pattern in the orders sent from the trading entity, taking advantage of the automatic nature of the programmed trading strategies. For example, a processing device (controlled by a competing trading entity, such as a hedge fund) may recognize a latency of X fractions of seconds between the time T0 at which a chain of events occurs, such as "chain of events 1", and the time T1 at which a corrective order is sent by the trading entity. The consistent latency between the two events allows the competing trading entity to adjust its trading strategies to take advantage of the latency detected between the two events. The systematic and quick recognition of such chains of events and their context is of primary value for a trading entity as it allows for an efficient adjustment of its own trading strategies, to avoid being systematically traded against.

Recreating and Displaying the Chronology of Market Events that Led to PnL Variations On a day to day basis, a single processing device owned or controlled by a trading entity may implement multiple trading strategies on more than one market. A trading strategy may also be implemented by more than one processing device, each device using one or more market data feed(s), for deciding which instructions are to be sent, based on the information conveyed by the market data feeds. It is therefore a challenge to identify the trading strategy that incurred an unusual or systematic profit or loss, in order to understand the context in which the variation occurred and identify the chain of events that caused the variation. According to one aspect, the proposed methods and systems described herein below aim to provide methods and systems that can recreate the decisional context in place when a transaction was executed and caused a PnL variation. Once the decisional context is recreated, it is possible to understand the cause of the variation (drop or increase of the value of the account) and readjust the trading strategy if needed.

In a possible implementation of the computer-implemented method, the first step consists in detecting a PnL variation, by analyzing a PnL account associated with one or more securities traded by the entity. As mentioned previously, a security may comprise cash, derivative instruments, stocks, commodities, bonds, futures, options, exchange traded funds (ETF), contracts, debt-based instruments, currencies traded on foreign exchange markets and/or equity-based instruments.

In order to identify a variation in the PnL, which will typically correspond to an unusual variation, the PnL account value associated with the one or more securities may need to be continuously or periodically calculated by the processing device. The identification of the PnL variation can be realized in various ways, including for example by detecting variations that are below or above a given threshold, by using machine learning algorithms, and/or by comparing all variations to a normal distribution of the PnL variations for the securities in question, where unusual variations to be studied are those at the extremities of the normal distribution, having for example a standard deviation above 2 or 3. Variations on a PnL account can be labeled as marginal, normal or unusual. For example, a trading entity may consider that any variation under the threshold of X$ should be ignored. Hence, variations above that threshold should all be considered as unusual variations, and those variations may be variations that a trading entity wants to systematically analyze.

Figure 2:
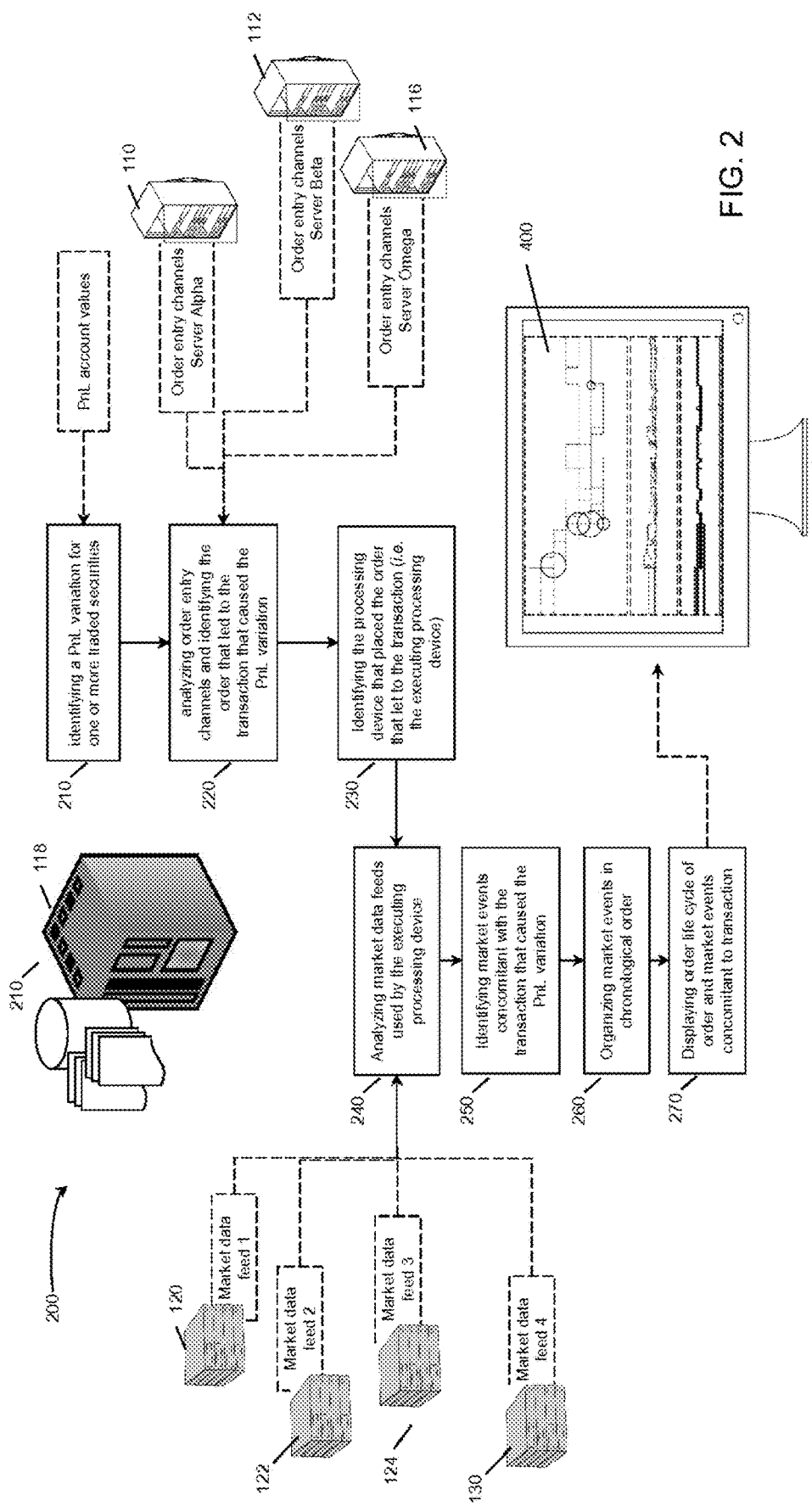
FIG. 2 is flow chart illustrating the various steps of a computer-implemented method for automatically recreating and displaying the chronology of market events that led to a variation in a profit and loss (PnL) account, according to a possible embodiment of the invention.

Referring to FIGS. 1 and 2, an exemplary environment for implementing the computer-implemented method is illustrated in FIG. 1, and the main steps of the method are illustrated in the flow chart of FIG. 2. As mentioned previously, one or more trading strategies may be programmed and implemented on one or more processing devices, such as processing device 110 (server Alpha), processing device 112 (server Beta), and processing device 116 (server Omega), located in two different cities, for the trading of a security. For example, an entity may be trading a derivative, such as an ETF (Exchange-Traded Fund), on a first exchange 130, such as the BATS stock exchange (BZX). The derivative has as an underlying, a commodity, such as crude oil, traded on another exchange 132 (CME). The entity may operate a number of servers, such as servers 110, 112, 116, each implementing a trading strategy for this derivative. Server Alpha is located in Chicago, close to the Chicago Mercantile Exchange (CME) where the underlying is traded, while the other servers Beta and Omega are located in New York, closer to the BZX where the derivative is traded. A central server (not illustrated) executes software instructions to calculate in real-time, or near real-time, a PnL account of different securities on which the derivative is based. When the aggregated PnL account shows an unusual variation (step 210), it is necessary to understand which one of the securities being traded caused the variation in the aggregated PnL account. Since a variation in a PnL account is systematically caused by a transaction relating to a security on which the PnL account is based, the automated method needs to identify the transaction in question that caused the variation.

From all the orders that are placed by the trading entity (such as a market maker), the ones that lead to transactions during a time period concomitant to the occurrence of the variation need to be identified. The transaction will typically occur during a period preceding the PnL variation, but it may also have occurred slightly thereafter. As mentioned previously, a trading entity typically owns or controls a plurality of trading processing devices (including for example servers, FPGAs, etc.) that are geographically remotely located from one another. Each trading processing device may place bid and ask orders, and at times complete transactions (or trades), in order to execute different trading strategies, which are generated by different trading algorithms. As in the example of FIG. 1, the different trading processing devices may be located at or close to the different exchanges where the securities of interest are being traded.

A variation on an aggregated PnL account can be the result of any one of several trading strategies. The variation is typically the result of a transaction on a security, caused by an action or lack of action, stemming from one of the various strategies. In order to identify which strategy caused the variation in the PnL account, it is necessary to identify the order that, when fulfilled, led to the transaction that caused the PnL variation.

Still referring to FIGS. 1 and 2, given that the order associated to the PnL variation could have been placed by any one of the processing devices of the trading entity, such as servers Alpha, Beta or Omega in the example, the various order entry channels used by the different processing devices are analyzed to identify the order in question (step 220). In the example of FIG. 1, the method is implemented by a central server (illustrated as server 118 in FIG. 2) remote from processing devices Alpha 110, Beta 112 or Omega 116, but it could be performed on any one of the processing devices 110, 112, 116. The method (as associated software application) can also be distributed between different processing devices. Order entry channels typically comprise the information of all orders sent to the different exchanges that are placed, modified or canceled, by the remote processing devices of a trading entity. To identify the order that led to the transaction, the time at which the PnL variation occurred can be compared to the time at which a transaction occurred for all of the securities on which the PnL account is based.

Once a concomitant transaction has been identified, the corresponding order from the entity can be determined by analyzing all order records comprised in the order entry channels that were issued by the processing devices. If not readily available, the device implementing the method first needs to request the relevant order entry channels, either from the processing devices (servers Alpha, Beta or Omega and Beta), or from a centralized server or database which maintains historical data of orders placed by the entity.

The processing device that placed the order can be identified (step 230), since an order record typically comprises the necessary information, such as a session ID, for the identification of the device that placed it. For example, a mapping table can be used to link the session IDs to the processing devices. The identified processing device can be referred to as the "executing processing device". For example, with reference to FIG. 1, the executing processing device can be server Omega. A data analysis module, run from the centralized server 118, requests and analyses all market data feeds (step 240) used by the executing processing device (server Omega), over a time interval that is related to the life cycle of the fulfilled order. As mentioned previously, different vendors and aggregators maintain and provide historical data of all market events occurring in different markets. From those market data feeds, market events that are concomitant to the transaction and the PnL variation are identified.

According to possible implementations, in order to determine which order entry channels and which market data feeds need to be requested and analyzed, a predetermined time period can be set, such as 1, 2, 3 or 5 seconds, prior to the time of the transaction. For example, if the transaction occurred at T0, then all market event records contained in the marked data feeds used by server Omega between T0 and T0±1 s can be analyzed. The time period will include a period before the transaction but can also extend beyond the time of the transaction. In other possible implementations, the relevant time period can be variable and be set to cover a period during which at least X market events have occurred before the variation at issue. The different market events (characterized by the different fields of the market event records) that occurred before or after the transaction leading to the PnL variation are referred to as "concomitant" market events (step 250). Concomitant market events can comprise, as examples only, any bid or ask for a security, regardless of whether it represents a price or a volume variation at the top of the book. Concomitant market events can also comprise completed transactions.

In the example provided, where the PnL account of a derivative is subjected to a sudden drop, mapping tables can be used to determine on which underlying securities the derivative is based. APIs can be also used to obtain the unique identifiers of the data streams associated to the securities. Using the identifiers, the streams of data can be requested from market data providers (such as Corvil). The data stream can then be filtered for a specific security and normalized into a uniform format by using, as examples only, parsing and decoding methods. The market data associated to a given security can already be timestamped with the time at which the market event occurred at the exchange, the time at which the market data was sent by a market data provider or the time at which a specific processing device of a trading entity received the market data. Alternatively, timestamps can be converted from one timeframe to another by adding or subtracting a known time delay. For example, the time delay for transmitting data between the servers of a market exchange and one of the entity's processing device can be already known. This time delay can thus be added to market data that is timestamped with the time at which it was sent by the exchange's server to obtain the reception time at the processing device. Time delays can take into account network communication delay or processing limitations. The use of timestamps and time delays allows to chronologically represent occurrences of market events from the standpoint of an exchange server (CME in FIG. 1), of a processing device located in the vicinity of the exchange (Server Alpha in FIG. 1) or of a processing device that is remotely located from the exchange servers (such as Servers Omega and Beta in FIG. 1).

The method thus comprises a step of organizing the market events in a common time frame to obtain a chronological representation of the context in which the transaction occurred (step 260), based on the timestamps of the concomitant market events previously identified. The time frame can correspond to the time frame of the executing processing device, such that the context corresponds to the executing processing device's standpoint. As previously mentioned, the different market data feeds are often provided in different formats and need to be processed to align or organize them in a common time frame that will allow for recreating the chronology of events that occurred at the time of the PnL variation from the standpoint of different processing devices, such as the executing processing device. As will be explained in more detail below, if needed, additional market data sent or received by other devices can be added to the chronology such that market events according to different time frames can be represented within the same interface simultaneously.

Figure 3:
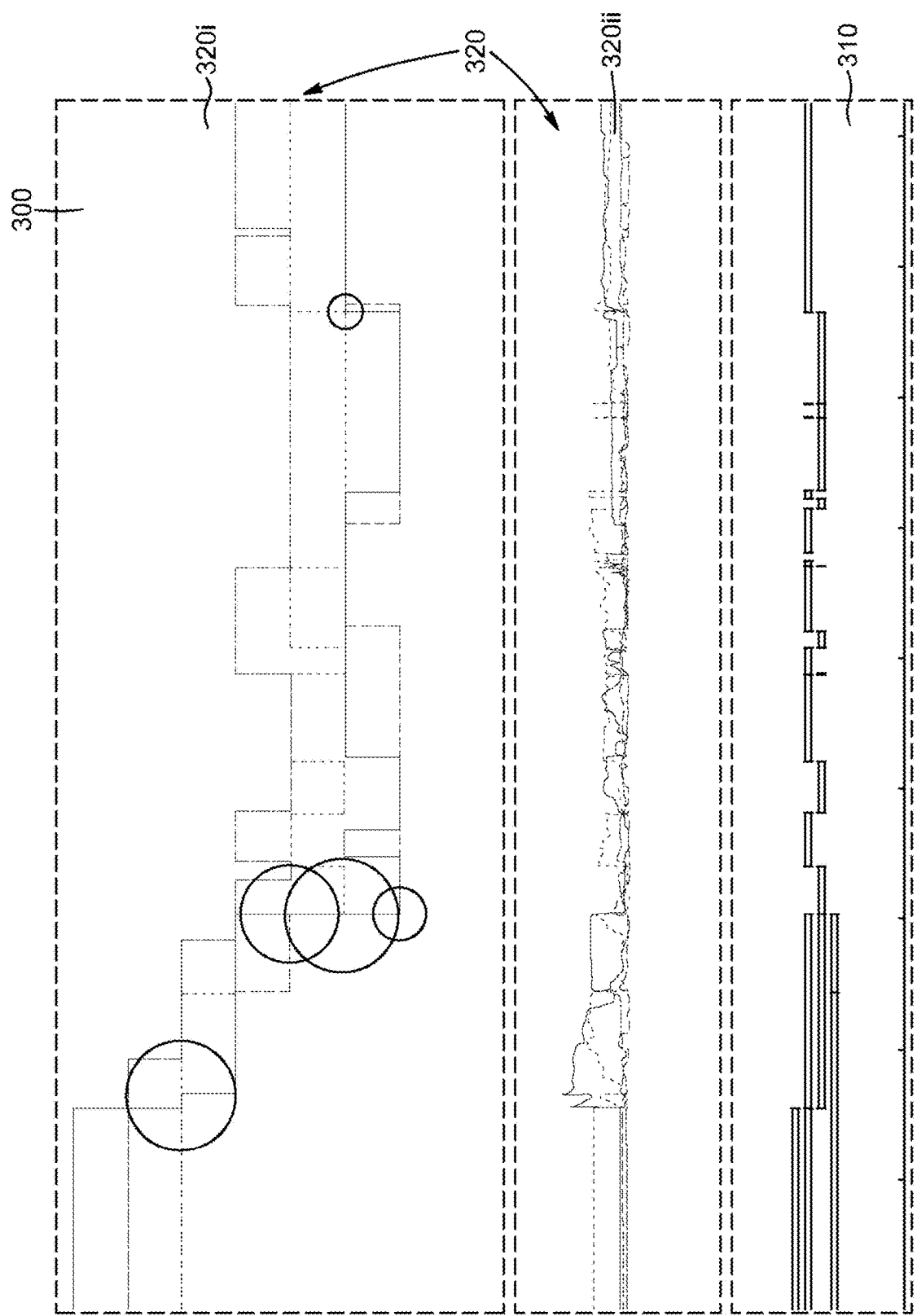
FIG. 3 is an illustration of a graphical user interface that displays the chronology of market events that led to a transaction that caused a variation in the PnL account, according to a possible embodiment.
Figure 4:
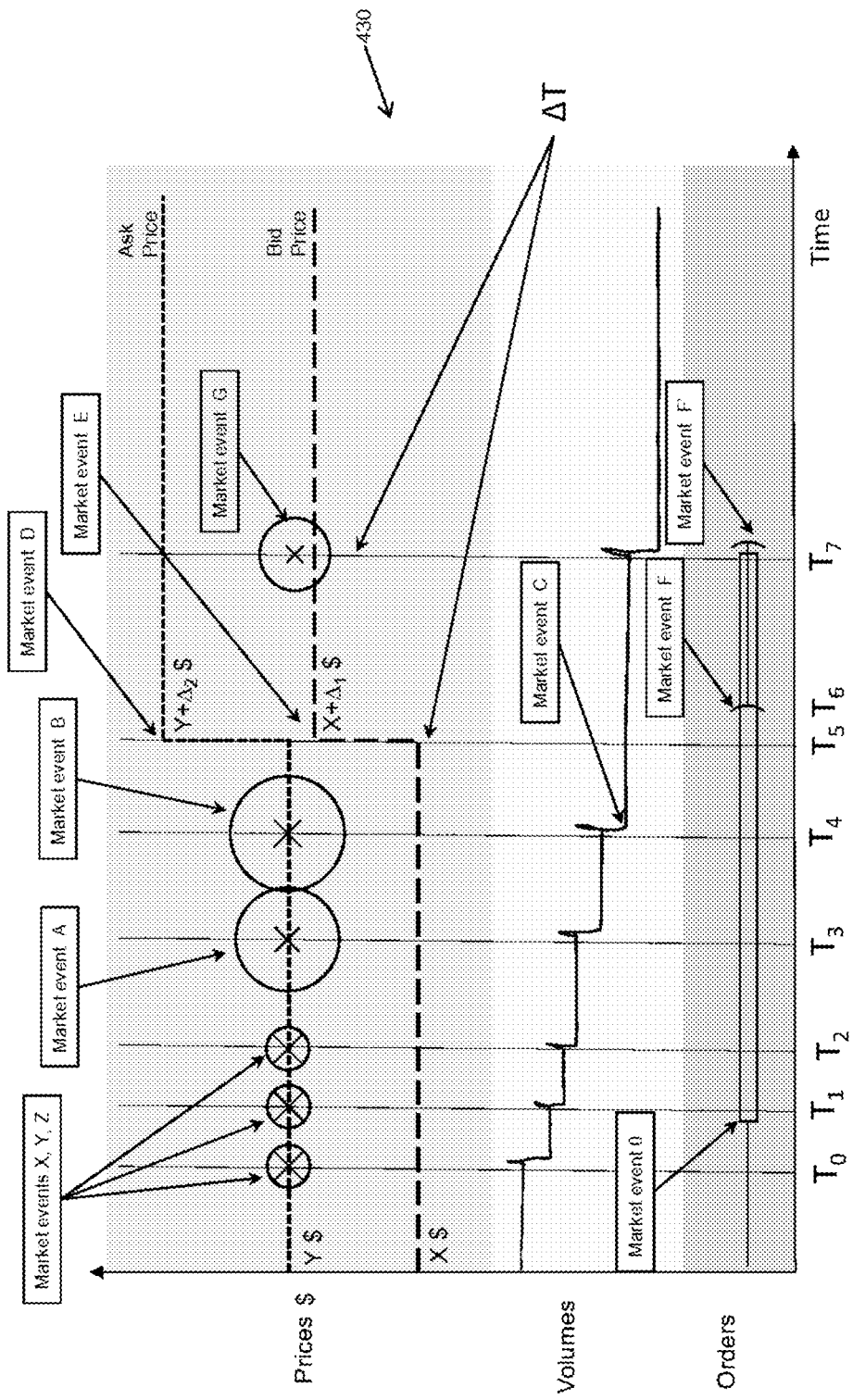
FIG. 4 is an enlarged view of a graphical user interface, showing that the delay or time difference between any two market events displayed on the interface can be measured.

Once the concomitant market events are organized chronologically in a given time frame, the chronology of the market events that may have led to the variation is recreated and can be displayed in an interactive graphical user interface (GUI), 40, such as shown in FIGS. 3 and 4, for interaction with, and analysis by a user (step 270). The GUI can display the life cycle of the identified order that led to the transaction, wherein the life cycle data is obtained from the entity's order entry channels. The life cycle of other concomitant orders from the trading entity can also be displayed on the GUI, to provide further context to the transaction.

In the exemplary GUI illustrated in FIG. 3, the orders are shown in the lower pane 310 of the GUI. An order life cycle can comprise any of: the time at which the order was placed, modified, executed/fulfilled or cancelled by or on behalf of the entity conducting the trading strategy; the bid or ask price and volume associated to the order; the acknowledge times from exchanges, including the acknowledge time at which the new order was received at the exchange ("ack on new order") and the acknowledge time at which the order was cancelled at the exchange ("ack on cancel order"); "fills" information including the time at which the order was fulfilled (or executed), the price and volume at which the order was fulfilled, wherein the order can be partially or fully fulfilled. All this information can be represented on the GUI, such as by using horizontal bars to show the beginning and end of the life's order, and contextual information on the order when a user hovers over a feature of the pane, as one possible implementation. The representation of FIG. 3 is an exemplary embodiment of a possible GUI, and other configurations and representations are possible.

Still referring to FIGS. 1 and 2, and also to FIGS. 3 and 4, the various market events identified as concomitant to the transaction, from the standpoint of server Omega, are displayed on the GUI. The GUI thus automatically recreates and displays the chronology of market events that led to the transaction that caused the variation of the PnL account. Additional market event data and/or additional order entry data can be added by users, to the GUI, allowing market events and order entries from the standpoint of additional processing devices to be displayed, wherein the additional processing devices can be part of the processing devices that implement the trading strategy or other processing devices that are not involved in the trading strategy. For example, different processing devices may receive the market event information at different times, and it may be relevant to understand whether the latency at the different processing devices had an impact on the PnL variation, to determine if it would be best to have portions of the strategy implemented by other processing devices. Different colors or line patterns are used for differentiating the different securities. Prices and/or volumes at specific times can be displayed with markers on the lines representing the different securities.

The GUI provides means for the users to request and add any information that is relevant to the identified trade. The information can be fetched from private mapping tables stored remotely, and from publicly available data, which the GUI application filters, normalizes and renders graphically in the different windowpanes. APIs that allow controlling the pixels directly by the GUI application can be used, so as to increase the accuracy of the information displayed on the interface.

The information displayed on the GUI can allow users to understand the context in which a transaction occurred and readjust the trading strategies or communication link architecture if needed. The GUI can automatically calculate and display a time delay between the actual time $T_i$ at which a market events occurred at an exchange and its receipt time $T_i+\Delta$ at the executing processing device, in order to determine whether the variation was caused by an excessive or anormal delay at the executing processing device.

In the exemplary GUI 300 of FIG. 3, panel 320$i$ comprises at least a price axis (vertical direction), for displaying price representations of the securities associated with the market events, and for displaying transaction representations associated with said securities, as a function of time. Panel 310 also comprises a time axis (horizontal direction) for displaying the life cycle of the identified order. The price representations displayed on panel 320$i$ are synchronized with the time axis of panel 310. Optionally, the lower portion of pane 320, indicated by 320$ii$, displays volume associated with the securities whose prices are displayed in the upper portion 320$i$ of pane 320. The volumes are displayed as segmented lines, wherein line breaks are indicative of a volume increase or a volume drop.

The geographical location of the executing processing device can be a parameter to consider in the implementation of a trading strategy, since a communication delay or latency at a processing device can explain why a processing device is systematically being "played" by a competing entity. For example, a server located in Chicago receiving market data feed from the BZX, may receive the feed a few fractions of a second later than a competing entity which owns a processing device located near or on the BZX premises. In that case, it may be decided to use a faster communication link for the Chicago server to reduce the latency as much possible, or to have the trading strategy executed by a processing device located closer to the BZX.

Referring to FIGS. 3 and 4, each market event that occurred during the defined time frame can be represented or distinguished using different colors, lines or shapes. Market events displayed on the GUI can include variations of the bid price, ask price, bid volume and/or ask volume. The prices and volumes of the same security, obtained from different sources (exchanges, private data feeds and/or market data vendors) can also be represented in the GUI, using different line patterns or colors. Labels and markers can be linked to the line to provide information (such as time, volume or price). In the close-up view illustrated in FIG. 4, price variations are illustrated as a function of time, and lines of different colors or format can be used to represent the bid and ask price for a security, and the circles represent completed trades. The size of the circles is proportional to the volume of securities traded and number or letters can be associated with the circles to identify the trading entity in the market on behalf of which a trade was completed. The prices of securities can be displayed as segmented lines wherein line breaks indicate a price increase or a price drop.

Still referring to FIG. 4, the GUI allows measuring time differences between any two market events and/or orders displayed on the user interface, preferably with at least a fraction of seconds precision. As an example only, the GUI can also allow time differences between a first market event or order, and a second market event or order, both represented on the same user interface, within the same time frame, to be measured, by capturing a first input by a user on the graphical user interface, positioned on or close to the market event representation; capturing a second input by the user on the graphical user interface, positioned on or close to the order representation; and by displaying on the graphical user interface the time difference ΔT between the first and second representations. Time differences can also be measured and displayed automatically, for specific classes or groups of events for example. The resolution of the GUI can be a function of the timestamps of the market data and orders data contained in the market data feeds and order entry channels and is therefore preferably at least in the order of fractions of seconds. Still referring to FIG. 4, a user can browse the GUI in various ways, such as zooming in and out of the interface, to better visualize the market event and order representations, down to the resolution of the market event and order data timestamps.

Automatic Identification of Chains of Market Events that Led to Unusual PnL Variations Referring now to FIG. 5, according to another aspect of the invention, a computer implemented method is provided to automatically identify chains of market events that lead to unusual PnL variations.

In this implementation, a classification module automatically classifies chains of market events that are concomitant with PnL variations, into market event classes. A classification module can be programmed with preset market event classes (schematically illustrated with boxes 591, 593, 595 in FIG. 5) and/or the market event classes can be created and updated as the method is being implemented. A class or category typically comprises the transaction as the "root" event, and additional market events can be added to the class. As an example, a market event class can comprise the series of events that triggers a given trading strategy to perform or to abstain from performing an activity, such as cancelling or not cancelling an order. A market event class can include the events that occurred before or after the transaction, since any event concomitant to the transaction, either before or after the transaction, may explain the cause of the PnL variation and/or context of the transaction. For example, the fact that a new price information was received by the processing device with too much delay, may explain why the transaction occurred, and caused a negative PnL variation.

FIG. 4 visually represents some of the market events that may have led to a variation of a PnL linked to a trading strategy. In this figure, two trades, identified as market event A and market event B, both involving large quantities of a security, are represented by the two circles on the left side of the interface. The two trades caused a drop of the available volume or quantity of this security on a first exchange (market event C). The trades were made at the top of the book price, where the lower broken line represents the bid price at X\$ and the upper broken line represents the ask price at Y\$. The transactions caused a variation of the top of the book ask and bid prices a few fractions of seconds after the trades occurred, since both lines increased respectively to Y\$+$\Delta_2$ and X\$+$\Delta_1$ (market event D and market event E). This means that competing trading entities are now willing to buy and sell the security at a higher price. In this example, trading entity 1, not involved in transactions A and B, had already placed an order to sell the security (identified by market event 0) at the previous ask price of Y (top of the book) before the price increased. Hence, now that the top of the book increased to Y+$\Delta_2$, trading entity 1 is now exposed to the competing trading entities that conducted transactions A and B, since they would be able to buy the security from trading entity 1 at the lower price Y, while the ask price has increased to Y+$\Delta_2$ after their respective trades. Therefore, trading entity 1 would need to send a request to the first exchange to cancel its order (market event F). If entity 1 order cancellation is not processed in time (market event F') and a trade (indicated by market event G) is completed at the previous price, the account value of entity 1 for the security will be affected. The proposed method provides means to automatically analyze large streams of market data, to identify chains of events that systematically lead to unusual or undesired PnL variations. Once a specific chain of market events has been identified as generally leading to a variation, such as a drop of the PnL, the trading strategy can be readjusted. Alternatively, it is possible to recognize chains of events that systematically lead to PnL increases, to better understand the context which led to the positive outcome and possibly replicate the winning trading strategy.

In the example of FIG. 4, the "root" market event of this chain or class can be the transaction identified by "market event G", that was completed at a lower price than the current price. Another event that forms part of the chain of events can be the increase of the ask price (market event D). Third and fourth market events could consist in the transactions made at the top of book price (market events A and B). In this example, market events 0, C, E, F, X, Y and Z are not included in the chain of event that caused a PnL variation, but a trading entity may decide to create a completely different chain of event comprising market event G, market event D, market event C and market event 0. In this example, the events that are added to the chain of events are events that occurred before the transaction that caused the PnL drop, but it would be possible to include events that occurred after the transaction. A market event class will thus generally include at least the transaction that caused the PnL drop or increase, and one or more events that occurred before or after the transaction, and typically during the lifetime of the order that was completed and caused the PnL variation.

Each time a significant change occurs at the top of the book for this security held by the trading entity 1, it is translated into a variation of the PnL for which there are three possible outcomes, i.e. positive, neutral or negative outcomes. A positive outcome would occur if trading entity 1 is able to cancel its order (market event F) before a competing trading entity fulfills the order. It is a positive outcome since the value of the volume of security effectively kept by trading entity 1 after the order cancelation has increased as a result of the change at the top of the book for this security. A negative outcome would occur if trading entity 1 is unable to cancel its order (market event F') before a competing trading entity fulfills the order (market event G). It is a negative outcome since the value of the volume of security sold by trading entity 1 to the competing trading entity is less (Y$) than its value after the change at the top of the book for this security (Y+$\Delta_2$). In this example, a market event class may comprise the following market events: two transactions of a large volume of the security by competing trading entities at the top of book (market events A and B), followed by a change at the top of the book prices and volumes (ask and bid prices increase as a result of the volumes exchanged and the ensuing natural scarcity of volumes available for trade—market events E and D), and finally the sale of securities at price Y (market event G). It would also be possible to create sub-classes from an initial set of market event. For example, an ask price increase could branch into two separated sub-classes: one where the cancellation of the order is made in time, one where cancellation is not made in time and leads to the sale of the security at a lower price than the current ask price.

Further market event classes can be created based on different types of events, and by adding on further events. Consider a chain of events comprising the two initial trades at the top of book price (market events A and B), the increase of the ask price from Y to Y+$\Delta_2$ (market event D); and the cancellation of an order to sell the security at the previous ask price of Y (market event F). The next event could consist in immediately sending a new order to aggressively buy securities on a second exchange, before the ask price also increases on a second exchange. According to a first scenario, the PnL variation would be negative if trading entity 1 had been traded against at the previous ask price of Y on the first exchange and hadn't been quick enough in sending a new buy order on the second exchange and to have it filled before the ask price increased on the second exchange. A second scenario would be neutral—the trading entity had been traded against at the previous ask price of Y on the first exchange and had been quick enough to buy securities before the ask price increased on the second exchange. The third scenario would be positive if the trading entity hadn't been traded against at the previous ask price of Y on the first exchange and had been quick enough to send a buy order and have it filled before the ask price increased on the second exchange. In this example, a classification logic module can create different classes for each scenario or can create classes that branch off from each other. A market event analyzer can be programmed to detect specific chains or series of market events and then automatically trigger corrective actions, such as placing new orders or cancelling existing ones. The market event classes can be predetermined and associated to known trading strategy challenges or can be created as the transactions are being completed, whereby the market event classes are continuously updated.

With reference to FIG. 5, in order to provide tools to analyze more efficiently transactions made by a given entity, it is possible to determine the PnL variation associated to transactions of interest (step 510). For example, it can be decided to analyze all the trades related to the market making activities made by the entity for a given derivative. For each transaction, the order placed by the entity that led to the transaction is identified (step 520). The processing device that placed the order is also identified (step 530). From the market data feeds used by the processing device, market events that are concomitant to the order and/or transaction are audited and categorized in classes (steps 540, 550). Each class of events can thus be associated to a transaction and a PnL variation. Unusual PnL variations associated to a class can then be detected. For example, an unusual PnL variation can be detected by comparing each PnL variation of a class to a statistical distribution of all PnL variations for said class—as schematically illustrated by graph 597 of FIG. 5. In this case, the PnL variations associated to a class of events have a normal distribution, and the extremities of the distribution correspond to unusual variations. Unusual variation can also be identified by detecting a change in the shape of the statistical distribution of the PnL account values, such as a bimodal negative distribution or by simply comparing each PnL variation to an average PnL variation for the transaction associated with a market event class, as explained previously.

As such, in one possible implementation, a chain of events associated with transactions is classified in a category or class, and an average value of all PnL variations for the category is calculated. Unusual variations or global negative variations can then be identified for this category. With an automated detection of unusual variations, such as consistent negative variations, alerts can be sent to one of the processing devices of the trading entity for an in-dept review of the chain of events that led to the variation and for allowing to adjust the trading strategy or the architecture of the entity's communication network to maintain, avoid or reinforce the anomaly detected. With reference to the above example, an alert could be sent to a trading entity when consistent variations occur in the subclass where the trading entity is unable to cancel its order before a competing trading entity trades against the order. Using the graphical user interface presented previously, analysis of the market events could show that one of the processing devices of the trading entity is systematically traded against by the same competing trading entity, exactly X fractions of seconds before the order is canceled. In response, adjustments, such as switching to a communication link with reduced latency, can be implemented. The trading entity can also decide to implement its trading strategy on another processing device, closer to the market from which market data feeds are sent. The trading entity can also reduce the lapse of time before its cancelation order is sent. For example, instead of triggering the cancellation request when detecting a new ask price of Y+$\Delta_1$, the cancel trigger can be replaced by detecting a trade between two competing trading entities outside of the top of the book.

Figure 6A:
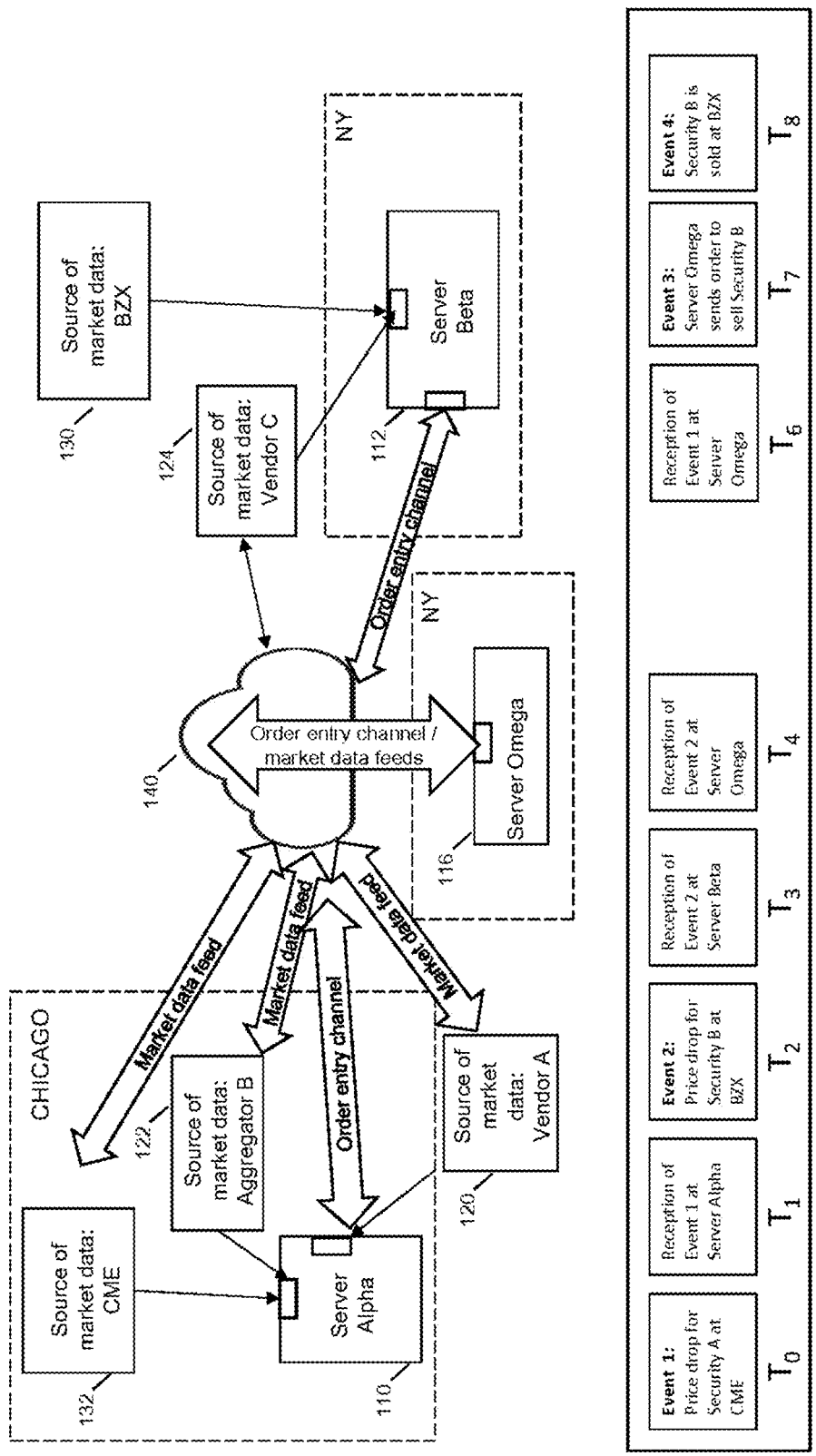
FIG. 6A is a schematic diagram illustrating an exemplary chain or series of market events occurring between different processing devices, according to an exemplary embodiment.
Figure 6B:
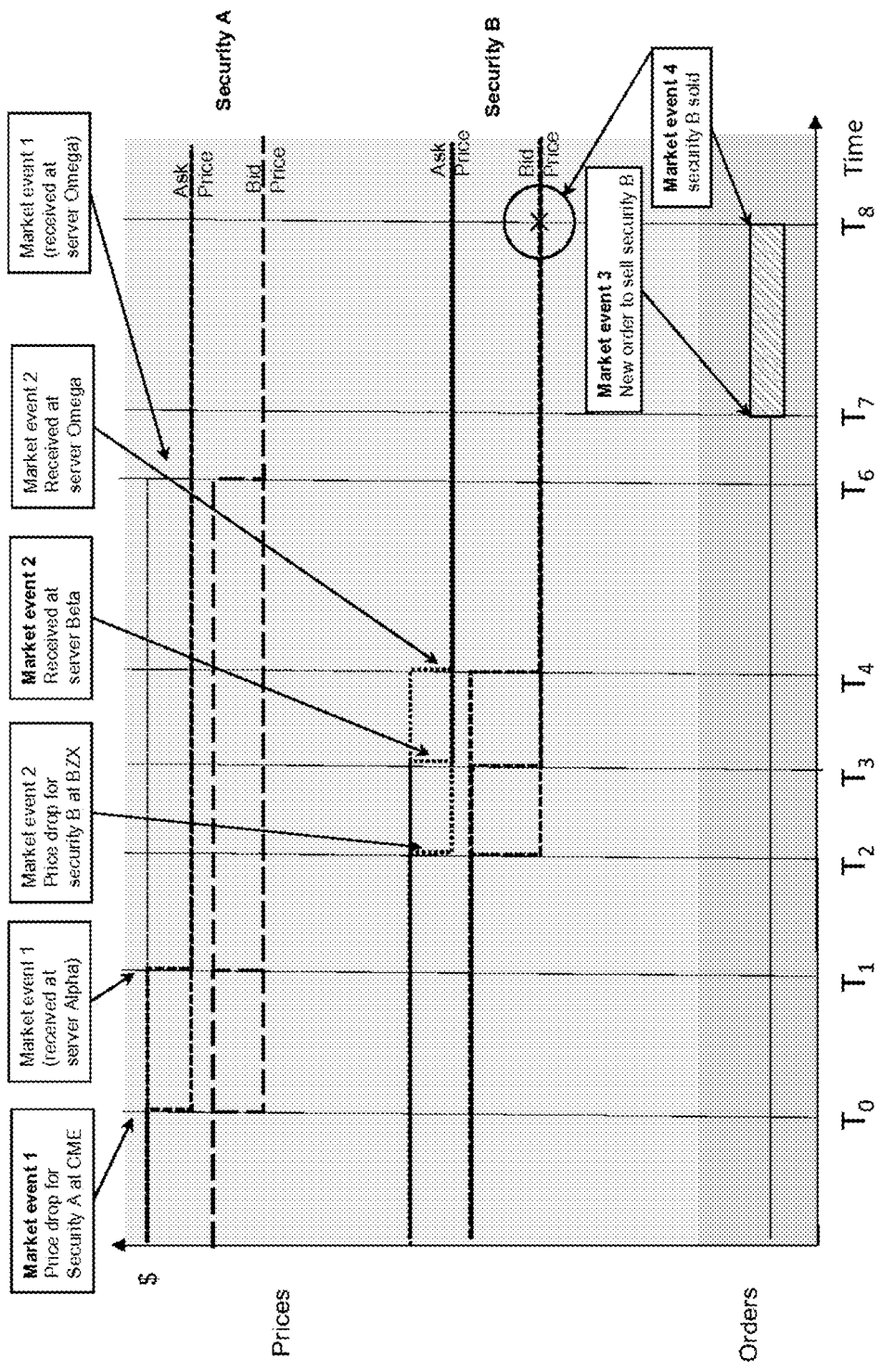
FIG. 6B is an exemplary graphical user interface illustrating the different market events of FIG. 6A from the standpoint of different processing devices.
Figure 7A:
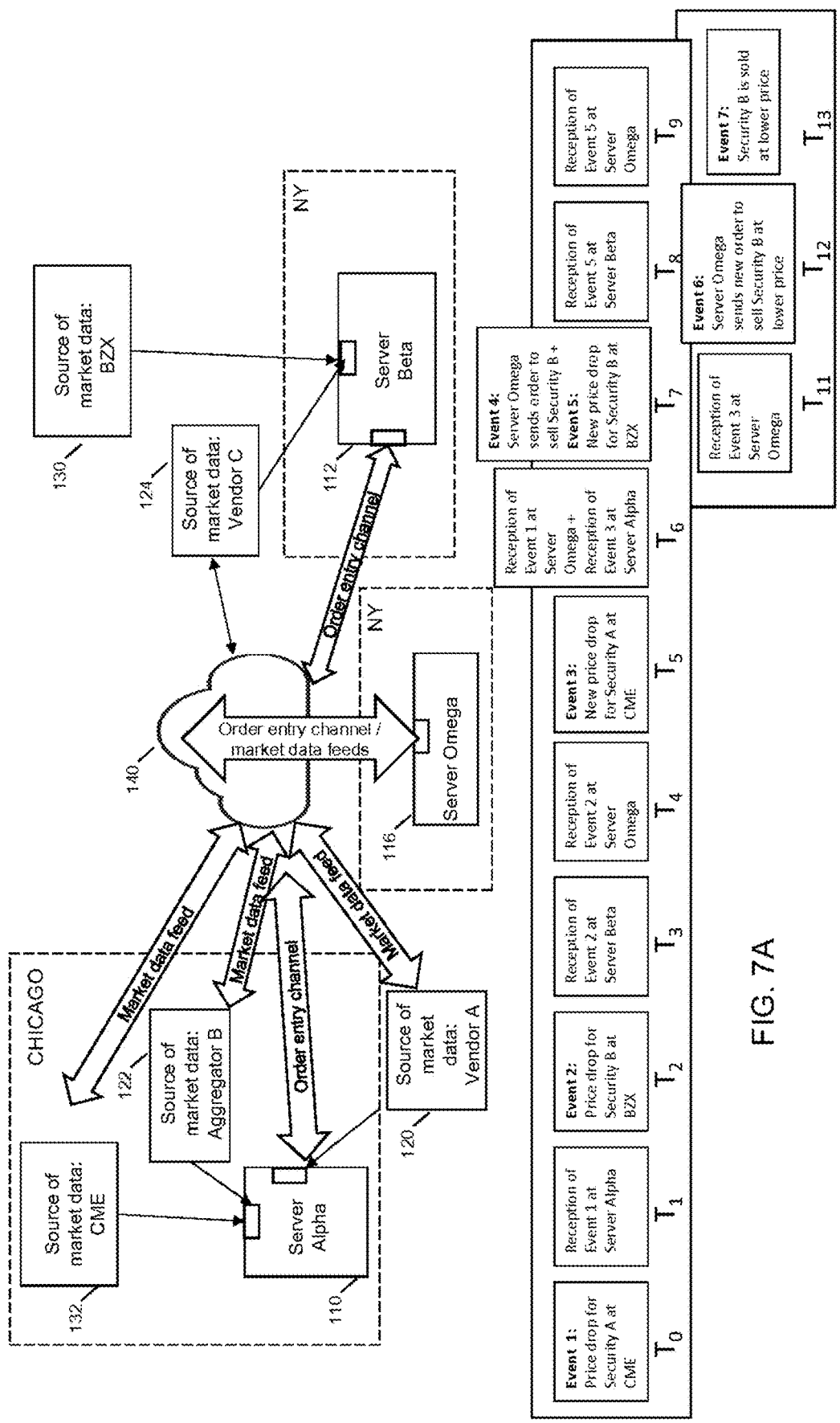
FIG. 7A is a schematic diagram illustrating another exemplary chain or series of market events occurring between different processing devices, according to an exemplary embodiment.
Figure 7B:
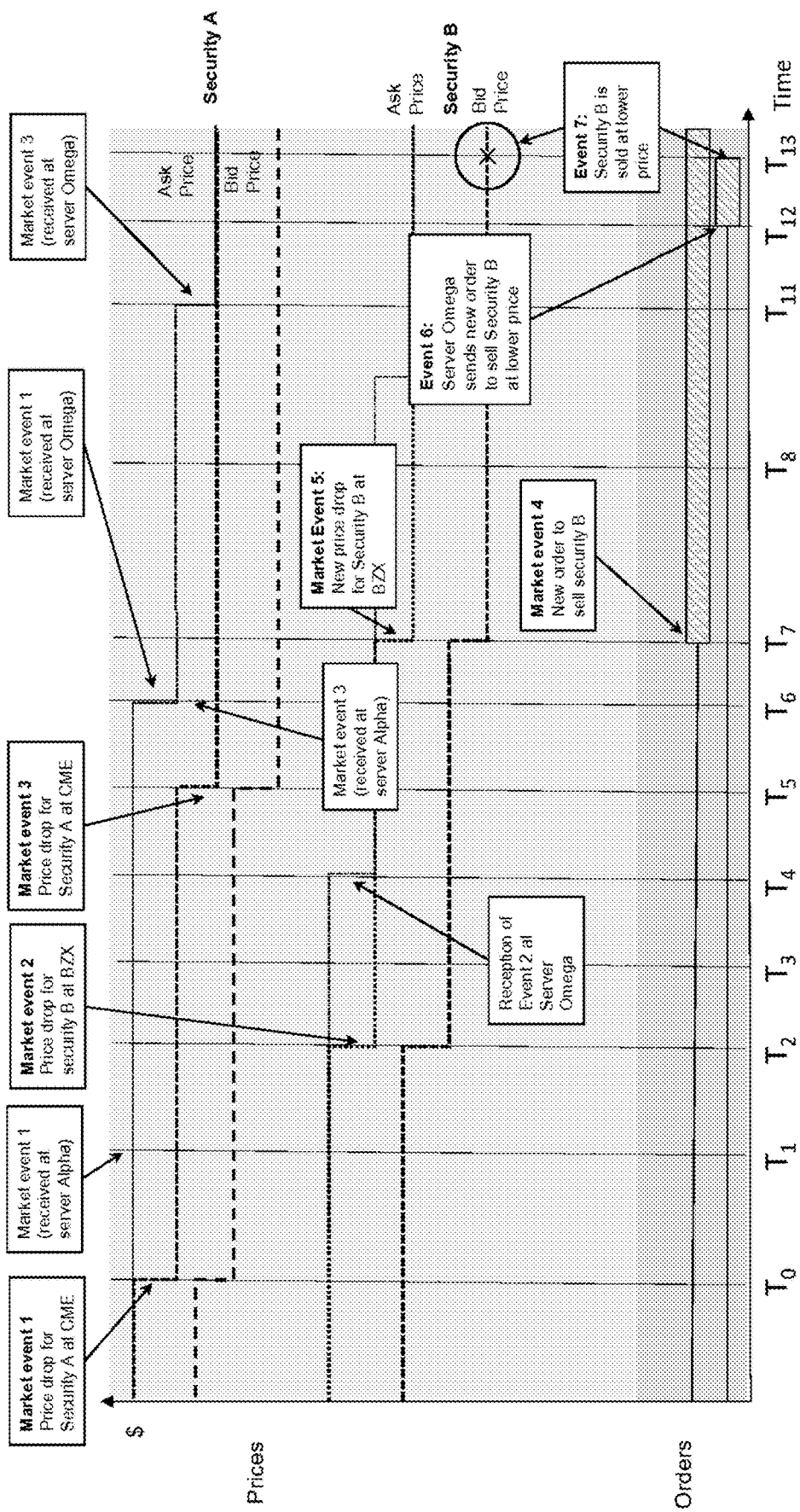
FIG. 7B is an exemplary graphical user interface illustrating the different market events of FIG. 7A from the standpoint of different processing devices.
Figure 8A:
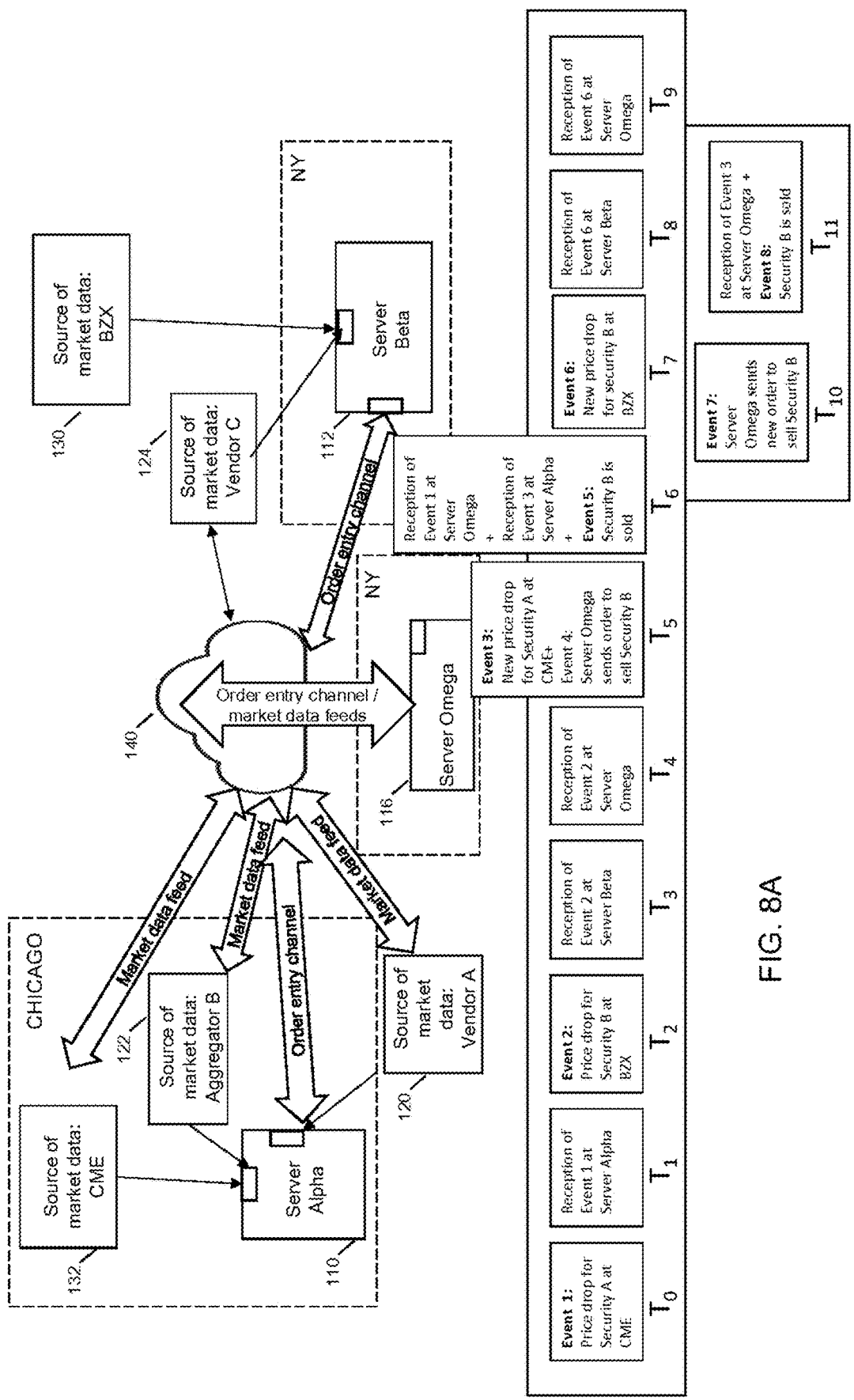
FIG. 8A is a schematic diagram illustrating another exemplary chain or series of market events occurring between different processing devices, according to an exemplary embodiment.
Figure 8B:
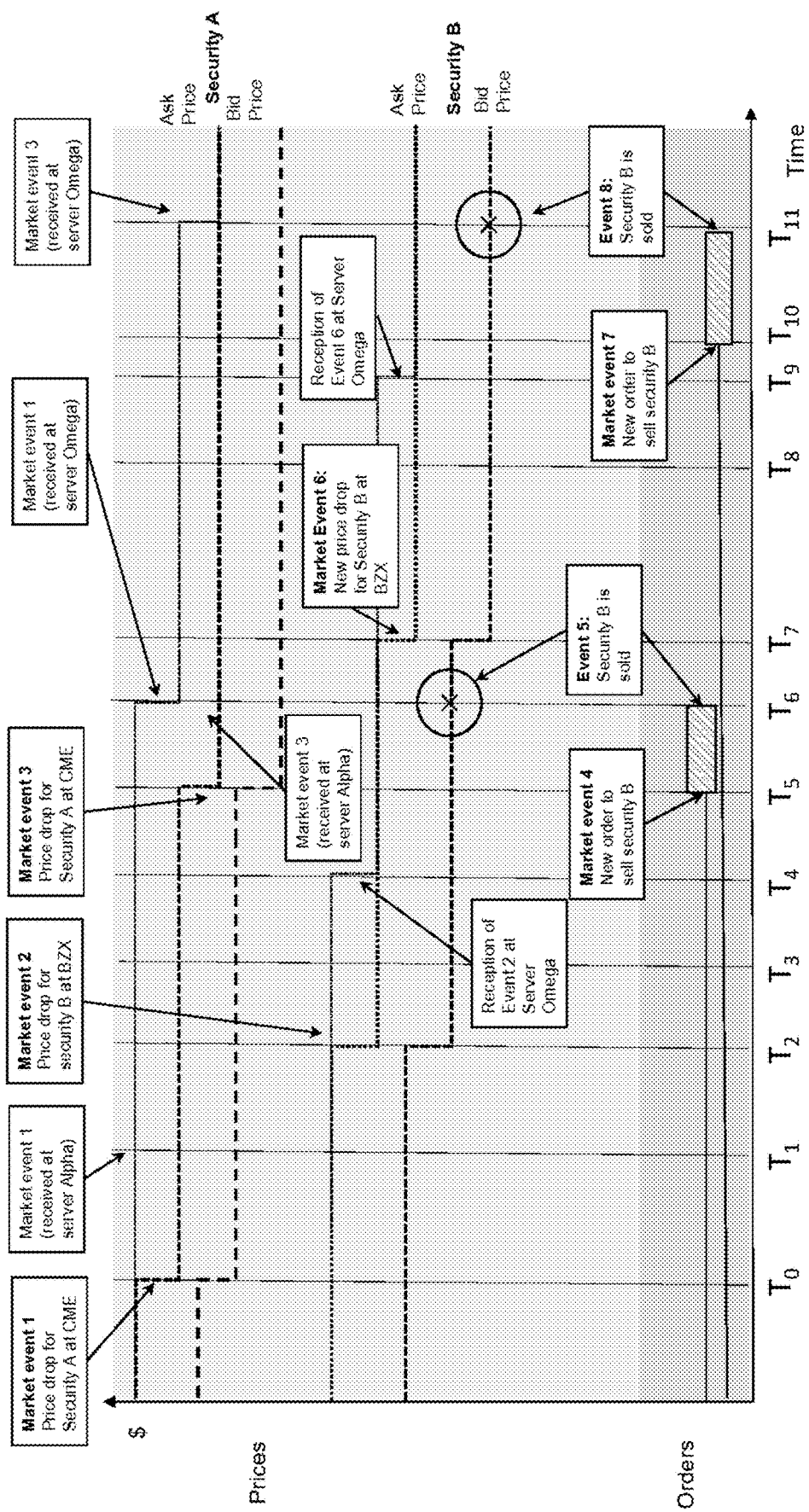
FIG. 8B is an exemplary graphical user interface illustrating the different market events of FIG. 8A from the standpoint of different processing devices.

The following paragraphs provide yet other examples of possible series of events occurring during a given trading session and relating to the trading of a given security, which can be automatically analyzed and illustrated with the proposed method and graphical user interface. FIGS. 6A, 7A and 8A schematically illustrate series of market events according to different scenarios, and FIGS. 6B, 7B and 8B represents exemplary GUIs generated by the proposed method, illustrating the different market events. It will noted that in FIGS. 7B and 8B, not all market events have been illustrated in the GUIs in order to simplify the description of the embodiment. Volumes of transactions are not illustrated for the same reason.

Referring to FIGS. 6A and 6B, a strategy may be executed on server Omega located in New York, configured to receive price information on security A, which is a commodity such as Oil, traded at the Chicago Mercantile Exchange (CME), and to sell security B, a derivative having Oil as an underlying, traded on the BATS Exchange (BZX), when the price of security A falls below a defined threshold. In this example, a new price information on security A, corresponding to a price drop at the top of the book, labeled as "Event 1", occurs at T0 in Chicago and arrives at a server Alpha located in Chicago at a different time of T1. Also, new price information on security B from BZX, describing a price drop at the top of the book, labeled as "Event 2" occurs at T2 at the BATS exchange and arrives at a server Beta in New York, at a different time of T3. Events 1 and 2 may then be communicated to server Omega, in New York, where the strategy is implemented. Event 2 arrives at server Omega at time T4 because of the proximity between servers Beta and Omega, while event 1 arrives at time T6 at server Omega because of the distance between servers Alpha and Omega. Since server Omega is configured to react upon reception of event 1 at T6, an order to sell security B on BZX is sent at T7 which is identified as "Event 3". The sale of security B ("Event 4") occurs at time T8. The method described previously allows automatically identifying a variation in the account for security B, identifying the transaction and order that caused the variation, identifying the different market events related to this transaction, and illustrating the different market events in a graphical user interface, from the standpoint of different processing devices, as per FIG. 6B thereby providing traders with relevant information regarding the cause and context of the PnL variation, in a timely and efficient manner.

In one scenario, and now referring to FIGS. 7A and 7B, the same trading strategy may lead to an unusual variation on the PnL account of security B because, for example, while waiting for the reception of "Event 1" at T6, the price of security A may have dropped even more at T5 ("Event 3"). The new price drop information may be received at T6 by server Alpha and only at T11 by server Omega, thereby preventing the order sent by server Omega at T7 ("Event 4") to be filled because the price of security B on BZX followed the price of its underlying at T7 ("Event 5"). Therefore, after the reception of the new price for security A at T11 by server Omega, on which the trading strategy depends, a new order is sent to sell security B at a lower price (T12: "Event 6") and is filled at T13 ("Event 7"). The above described methods may then be applied: market events used by server Omega that were concomitant to the "Event 7" transaction, and that spread over the period from T0 to T13 can be requested. According to the proposed method, the different market events can be aligned chronologically from the standpoint of both servers Alpha and Omega and illustrated in a graphical user interface similar to the one shown in FIGS. 3 and 4. If the chronology of events shows that the delay of communication between servers Alpha and Omega prevented server Omega from selling security B at a higher price while it already had a relevant information at T4 in event 2, and thus led to a negative PnL variation, this information can be used by traders to readjust the strategy or modify the architecture of the communication network 140, if needed.

An example of strategy adjustment is illustrated with reference to FIGS. 8A and 8B. The trading strategy implemented on server Omega is now configured to sell security B as soon as it receives information that its price fell below a defined threshold, instead of waiting for market data indicating that the price of its underlying, security A, also dropped below a defined threshold. Therefore, after the reception of event 2 by server Omega at T4, server Omega immediately sends an order to sell security B at T5 (event 4), while the price of security A dropped event more (event 3). The order sent by server Omega is filled at T6 (event 5) before the price drop of security A could impact negatively the price for security B (event 6) at T7, which information is received at server Omega at T9 and triggers a new order to sell security B (event 7 at T10 and event 8 at T11). In this example, at least a portion of the volume of security B held by the trading entity is sold before the second price drop, instead of none as in the scenario described in FIG. 7A, which is translated into a smaller negative PnL variation. The proposed method allows recognizing and visualizing different market events from the standpoint of different servers and readjust the trading strategies and configuration of servers if required.

As can be appreciated, the proposed method allows the recreation of the decisional context in which a PnL variation occurred, and that context can be visually presented, in a single graphical interface, as an overlay of the different key market events that occurred slightly before and after the time of the variation, using different sources of information, including both public trading feeds and private trading feeds. Once presented on a graphical user interface, the market context can be visualized and analyzed more efficiently and with more granularity. For example, one could see that the transaction that caused the drop is linked to an order that was to be cancelled, but that the cancellation wasn't made fast enough, and another entity was able to place an ask order against the bid order to complete the transaction. One would want to understand why the order cancellation wasn't made fast enough, what information did the server use at that time, etc. Being able to graphically display, in a single view, the complete market context that occurred at the time of the PnL dropped greatly facilitates the understanding the causes that led to the drop, enabling the necessary adjustments thereafter.

According to a further aspect, the proposed method also allows generating a "circumstantial" graph or chain of events that led to the transaction and caused the PnL variation. From the order that led to the transaction, each market event that occurred previously (for example, a price drop, an order placed by another entity, a cancellation that wasn't completed) can be chained to the "root event" (typically: the trade that caused the PnL variation). The chain of events thus created can therefore be associated to the PnL price variation and can explain a "slippage" in the trading strategy.

Each time a PnL variation occurs, the contextual market situation can be recreated from a given server/processing device standpoint, using the method described above and the different events that occurred before the variation can be detected, and classified in different "chains of events". Different types of events can thus be associated to different types of chains of events. Using the different chains of events, market data can be continuously analyzed, and alerts can be sent to traders when a given chain of events is detected, providing the possibility for adjusting the strategy in near real time.

It is important to note that trading entities, including market makers, can complete several thousands of transactions a day. Up to now, establishing a correspondence between PnL variations and specific transactions by an automated process, in a timely manner was not possible, and the graphical user interface, and underlying event classification derived is therefore certainly a powerful tool for traders and market makers.

Of course, numerous modifications could be made to the embodiments described above without departing from the scope of the present disclosure.

The invention claimed is:

1. A computer implemented method for automatically recreating and displaying a chronology of market events that led to a variation in a profit and loss (PnL) account of an entity implementing a trading strategy, the trading strategy being executed by a plurality of processing devices which are remotely located from one another, comprising:
   detecting a PnL variation by analyzing a value of an aggregated PnL account associated with one or more securities traded by the entity, the value of the aggregated PnL account being calculated by a central server operatively connected to the plurality of processing devices in real-time or near-real time;
   analyzing order entry channels sent and received by each of the plurality of processing devices, the order entry channels comprising orders placed by the entity, each order being associated with a session ID, and identifying therefrom a variation order that, when fulfilled, led to a transaction that caused the PnL variation, the variation order being identified by comparing a transaction timestamp with a time at which the PnL variation occurred;
   identifying, from the plurality of processing devices, an executing processing device that placed the variation order which led to the transaction using a mapping table linking session IDs to the plurality of processing devices;
   requesting, from servers of market data providers, using an Application Programming Interface (API), market data feeds associated with underlying securities on which the one or more securities traded by the entity are based;
   analyzing the market data feeds that were used by the executing processing device when the variation order was fulfilled, including filtering the market data feeds based on unique identifiers associated with the underlying securities and normalizing the market data feeds into a uniform format to obtain normalized market data;
   further identifying, from said market data feeds used by the executing processing device, concomitant market events that were concomitant with the transaction that caused the PnL variation, based on timestamps derived from the normalized market data;
   using the timestamps derived from the normalized market data, organizing the concomitant market events in a time frame to obtain a chronological representation thereof, from a standpoint of the executing processing device;
   displaying within a graphical user interface:
      a life cycle of the variation order that led to the transaction, wherein life cycle data is obtained from one or more order entry channels associated with the entity; and
      the concomitant market events, wherein the concomitant market events are provided by the market data feeds;
   capturing a first input by a user on the graphical user interface, positioned on or close to a first market event representation;
   capturing a second input by the user on the graphical user interface, positioned on or close to a second market event representation;
   measuring time differences between the first market event representation and the second market event representation; and
   displaying on the graphical user interface the time differences between the first market event representation and the second market event representation;
   whereby the graphical user interface automatically recreates and displays the chronology of the market events that led to the transaction that caused the variation of the aggregated PnL account, and calculates, based on captured user inputs, the time differences of the market events that occurred on remote processing devices from the standpoint of the executing processing device.

2. The computer-implemented method according to claim 1, further comprising continuously calculating the value of the aggregated PnL account associated to the one or more securities.

3. The computer-implemented method according to claim 1, wherein detecting the variation in the aggregated PnL account comprises at least one of:
   detecting unusual variations that are below or above a given threshold, detecting variations using machine learning algorithms, and comparing the variation to a statistical distribution of PnL variations for said one or more securities.

4. The computer-implemented method according to claim 1, wherein the life cycle of the variation order comprises at least one of:
   the time at which the variation order was placed, modified, killed, executed/fulfilled or cancelled by the entity conducting the trading strategy;
   a bid price or ask price associated to said variation order, and a bid volume or ask volume associated to said variation order;
   acknowledge times of exchanges, including a first acknowledge time at which the variation order was received at the exchanges ("ack on new order") and a second acknowledge time at which the variation order was cancelled at the exchanges ("ack on cancel order"); and
   "fills" information including the time at which the variation order was fulfilled or executed, a price at which the variation order was fulfilled and a volume at which the variation order was fulfilled, wherein the variation order can be partially or fully fulfilled.

5. The computer-implemented method according to claim 1, further comprising displaying, in the graphical user interface, additional market event data and/or additional order entry data from the standpoint of additional processing devices, wherein said additional processing devices can be part of the plurality of processing devices or not.

6. The computer-implemented method according to claim 5, further comprising calculating a time delay between an actual time at which one of the market events occurred at an exchange and its receipt time at the executing processing device, in order to determine whether the variation was caused by said time delay at the executing processing device.

7. The computer-implemented method according to claim 6, further comprising calculating a second time delay between a receive time at which one of the market events was received at a given one of the plurality of processing devices and a receipt time at the executing processing device.

8. The computer-implemented method according to claim 5, wherein the graphical user interface displays:
   a first panel comprising at least a price axis, for displaying price representations of associated securities associated with the market events, and for displaying transaction representations associated with said associated securities; and a second panel comprising a time axis for displaying the life cycle of the variation order;

wherein the price representations displayed on the first panel are synchronized with the time axis of the second panel.

9. The computer-implemented method according to claim 7, further comprising measuring arbitrary time differences between any two market events and/or order representations displayed on the graphical user interface, with at least a fraction of second precision, and displaying said arbitrary time differences on the graphical user interface.

10. The computer-implemented method according to claim 1, further comprising displaying the graphical user interface with a resolution that is a function of the timestamps of market data and order data contained in the market data feeds and the order entry channels.

11. The computer-implemented method according to claim 10, wherein the resolution of the graphical user interface is at least in the order of fractions of seconds.

12. The computer-implemented method according to claim 11, comprising displaying the graphical user interface by zooming therein or thereout, down to the resolution of the timestamps of the market data and the order data, allowing users to better visualize the market events and order representations.

13. A computer-implemented method for automatically identifying chains of market events that led to unusual PnL variations in a profit and loss (PnL) account of a group of securities traded by an entity implementing a trading strategy, the trading strategy being executed by a plurality of remote processing devices remotely located from one another, comprising:

for a transaction of a selected group of transactions completed for a security or a securities group traded by the entity:

calculating a PnL account value of the security or the securities group before and after the transaction occurred, and determining a PnL variation associated with the transaction, the PnL account value being calculated by a central server operatively connected to the plurality of remote processing devices in real-time or near-real time;

analyzing order entry channels sent and received by the plurality of remote processing devices, the order entry channels comprising a plurality of orders placed by the entity, an order of the plurality of orders being associated with a session ID, and identifying therefrom a variation order placed by the entity that, when fulfilled, led to a causal transaction that caused the PnL variation, the order being identified by comparing a transaction timestamp with a time at which the PnL variation occurred;

identifying, from the plurality of remote processing devices, an executing processing device that placed the variation order which led to the causal transaction using a mapping table linking session IDs to the plurality of remote processing devices;

requesting, from servers of market data providers, using an Application Programming Interface (API), market data feeds associated with underlying securities on which the group of securities traded by the entity are based;

identifying the market data feeds used by the executing processing device before or after the time the causal transaction occurred, by filtering the market data feeds based on unique identifiers associated with the underlying securities and normalizing the market data feeds into a uniform format to obtain normalized market events;

identifying, from the market data feeds used by the executing processing device, concomitant market events that occurred before the causal transaction, or thereafter, over a given period, based on timestamps derived from the normalized market events; and auditing the concomitant market events and automatically classifying them, using a classification module, into market event classes, a market event class comprising: the transaction and at least one concomitant market event;

continuously associating with each market event class, the PnL variation determined when a given transaction occurred and was preceded or followed by the concomitant market events in said market event class;

detecting an unusual PnL variation associated with a class by continuously comparing each PnL variation of the class to a statistical distribution of PnL variations of said class, whereby a chain of events that led to the unusual PnL variation corresponds to the market events of said class;

wherein auditing the concomitant market events and classifying them into the market event classes comprises a step of organizing the concomitant market events in a time frame to obtain a chronological representation of the market events from a standpoint of the executing processing device that placed the order that led to the causal transaction that caused the PnL variation.

14. The computer-implemented method according to claim 13, wherein the step of analyzing the order entry channels comprises analyzing the order entry channels sent to different exchanges by the plurality of remote processing devices of the entity.

15. The computer-implemented method according to claim 13, wherein the given period during which the market events are identified as the concomitant market events comprises at least a duration or life cycle of the variation order associated with the transaction.

16. The computer-implemented method according to claim 13, wherein the market event classes are predetermined and associated to known trading strategy slippages or are created as associated transactions are being completed, whereby the market event classes are continuously being updated.

17. The computer-implemented method according to claim 13, wherein the step of detecting an unusual variation comprises comparing each PnL variation to an average PnL variation for the transaction associated with the market event class.

18. The computer-implemented method according to claim 13, wherein the step of detecting an unusual variation comprises detecting a change in a shape of a statistical distribution of PnL account values, such as a bimodal distribution.

19. The computer-implemented method according to claim 13, further generating an alert when the unusual PnL variation for a given market event class is detected, said alert comprising an indication of an event chain that led to the unusual PnL variation.

20. A system for automatically recreating and displaying a chronology of market events that led to a variation in a profit and loss (PnL) account of an entity implementing a trading strategy, the trading strategy being executed on a plurality of processing devices which are remotely located from one another, the system comprising one or more processing devices, a storage medium operatively connected to the one or more processing devices and a graphical user interface operatively connected to the one or more processing devices, the storage medium having stored thereon instructions for causing the one or more processing devices to:

identify a PnL variation by analyzing an aggregated PnL account associated to one or more securities traded by the entity, a value of the aggregated PnL account being calculated by a central server operatively connected to the plurality of processing devices in real-time or near-real time;

analyze order entry channels sent and received by the plurality of processing devices, the order entry channels comprising orders placed by the entity, each order being associated with a session ID, and identifying therefrom a variation order that, when fulfilled, led to a transaction that caused the PnL variation, the variation order being identified by comparing a transaction timestamp with a time at which the PnL variation occurred;

identify, from the plurality of processing devices, an executing processing device that placed an identified order which led to the transaction using a mapping table linking session IDs to processing devices;

request, from servers of market data providers, using an Application Programming Interface (API), market data feeds associated with underlying securities on which the one or more securities traded by the entity are based;

analyze the market data feeds that were used by the executing processing device when the identified order was fulfilled, comprising filtering the market data feeds based on unique identifiers associated with the underlying securities and normalizing the market data feeds into a uniform format to obtain normalized market events;

further identify, from said market data feeds used by the executing processing device, concomitant market events that were concomitant with the transaction that caused the PnL variation, based on timestamps derived from the normalized market events;

using the timestamps, organizing the concomitant market events in a time frame to obtain a chronological representation thereof from a standpoint of the executing processing device;

display within the graphical user interface:
  a life cycle of the variation order that led to the transaction, wherein life cycle data is obtained from one or more order entry channels associated with the entity, and
  the concomitant market events, wherein the concomitant market events are provided by the market data feeds;

capturing a first input by a user on the graphical user interface, positioned on or close to a first market event representation;

capturing a second input by the user on the graphical user interface, positioned on or close to a second market event representation;

measuring arbitrary time differences between any two market event representations; and displaying on the graphical user interface a time difference between the first market event representation and the second market event representation;

whereby the graphical user interface automatically recreates and displays the chronology of the market events that led to the transaction that caused the variation of the PnL account, and calculates, based on captured user inputs, calculated time differences of the market events that occurred on remote processing devices from the standpoint of the executing processing device.

* * * * *